United States Patent
Fliearman et al.

(10) Patent No.: US 11,686,374 B2
(45) Date of Patent: Jun. 27, 2023

(54) WORK VEHICLE MULTI-SPEED DRIVE ASSEMBLY PROVIDING MULTIPLE GEAR RATIOS AT SAME STEP RATIO

(71) Applicant: Deere & Company, Moline, IL (US)

(72) Inventors: Steven R. Fliearman, Coffeyville, KS (US); Clayton G. Janasek, Independence, MO (US); Lisa R. Lloyd, Independence, KS (US)

(73) Assignee: DEERE & COMPANY, Moline, IL (US)

( * ) Notice: Subject to any disclaimer, the term of this patent is extended or adjusted under 35 U.S.C. 154(b) by 25 days.

(21) Appl. No.: 17/384,127

(22) Filed: Jul. 23, 2021

(65) Prior Publication Data

US 2023/0025749 A1 Jan. 26, 2023

(51) Int. Cl.
*F16H 3/64* (2006.01)

(52) U.S. Cl.
CPC ....... *F16H 3/64* (2013.01); *F16H 2200/0034* (2013.01); *F16H 2200/0039* (2013.01); *F16H 2200/0086* (2013.01); *F16H 2200/0091* (2013.01); *F16H 2200/2007* (2013.01); *F16H 2200/2035* (2013.01); *F16H 2200/2038* (2013.01)

(58) Field of Classification Search
CPC ...... F16H 2200/2007–2017; F16H 2200/2038; F16H 2200/2066; F16H 3/62–66
See application file for complete search history.

(56) References Cited

U.S. PATENT DOCUMENTS

| 1,625,564 A | 4/1927 | Pollard |
| 2,685,948 A | 8/1954 | Freeman et al. |

(Continued)

FOREIGN PATENT DOCUMENTS

| CN | 106763565 A | 5/2017 |
| DE | 2619011 A1 | 12/1981 |

(Continued)

OTHER PUBLICATIONS

USPTO Non-Final Office Action dated May 13, 2022 for Utility U.S. Appl. No. 17/185,713.

(Continued)

*Primary Examiner* — Huan Le
*Assistant Examiner* — Lillian T Nguyen
(74) *Attorney, Agent, or Firm* — Klintworth & Rozenblat IP LLP

(57) ABSTRACT

A drive assembly for a work vehicle includes a housing arrangement, a drive shaft rotatable in first and second clock directions, and a two-stage planetary gear set coupled to the drive shaft. The gear set includes, or is coupled to, an output element. First and second clutch arrangements are configured to selectively engage the gear set to effect first and second gear ratios, respectively. A step ratio from the first gear ratio and the second gear ratio is 3:1. At least one first actuator and at least one second actuator are configured to effect movement of the first and second clutch arrangements, respectively, to selectively engage the gear set. The drive shaft and the output element rotate in a same clock direction with the first clutch arrangement engaged with the gear set, and in opposite clock directions with the second clutch arrangement engaged with the gear set.

20 Claims, 18 Drawing Sheets

(56) References Cited

U.S. PATENT DOCUMENTS

| | | |
|---|---|---|
| 3,062,073 A | 11/1962 | Brass |
| 3,081,759 A | 3/1963 | Mauck et al. |
| 3,150,544 A | 9/1964 | Brass |
| 3,640,152 A | 2/1972 | Shirai et al. |
| 3,675,511 A | 7/1972 | Wakamatsu et al. |
| 3,942,024 A | 3/1976 | Ingham |
| 4,122,354 A | 10/1978 | Howland |
| 4,213,299 A | 7/1980 | Sharar |
| 4,473,752 A | 9/1984 | Cronin |
| 4,484,495 A | 11/1984 | Mason |
| 4,569,252 A | 2/1986 | Harper |
| 4,631,455 A | 12/1986 | Taishoff |
| 4,708,030 A | 11/1987 | Cordner |
| 4,750,384 A | 6/1988 | Belliveau |
| 4,862,009 A | 8/1989 | King |
| 4,916,980 A * | 4/1990 | Asada ................... F16H 3/66 475/281 |
| 4,926,713 A | 5/1990 | Madill |
| 5,033,994 A | 7/1991 | Wu |
| 5,177,968 A | 1/1993 | Fellows |
| 5,418,400 A | 5/1995 | Stockton |
| 5,558,173 A | 9/1996 | Sherman |
| 5,856,709 A | 1/1999 | Ibaraki et al. |
| 5,993,354 A | 11/1999 | Winks |
| 6,015,363 A | 1/2000 | Mathis |
| 6,371,877 B1 | 4/2002 | Schroeder et al. |
| 6,378,479 B1 | 4/2002 | Nishidate et al. |
| RE37,743 E | 6/2002 | Yang |
| 6,409,622 B1 | 6/2002 | Bolz et al. |
| 6,484,596 B2 | 11/2002 | Puchas |
| 6,527,658 B2 | 3/2003 | Holmes et al. |
| 6,569,054 B2 | 5/2003 | Kato |
| 6,582,333 B2 | 6/2003 | Man |
| 6,661,109 B2 | 12/2003 | Fukasaku et al. |
| 6,746,354 B1 | 6/2004 | Ziemer |
| 6,770,005 B2 | 8/2004 | Aikawa et al. |
| 6,811,010 B1 | 11/2004 | Armstrong |
| 6,832,970 B2 | 12/2004 | Eibler |
| 6,852,063 B2 | 2/2005 | Takahashi et al. |
| 6,910,453 B2 | 6/2005 | Sugino et al. |
| 6,965,173 B2 | 11/2005 | Fukasaku et al. |
| 7,028,794 B2 | 4/2006 | Odahara et al. |
| 7,044,255 B2 | 5/2006 | Maeda et al. |
| 7,086,978 B2 | 8/2006 | Aikawa et al. |
| 7,117,965 B2 | 10/2006 | Yatabe et al. |
| 7,223,191 B2 | 5/2007 | Aikawa et al. |
| 7,374,031 B2 | 5/2008 | Skorucak |
| 7,387,043 B2 | 6/2008 | Sakamoto et al. |
| 7,503,871 B2 | 3/2009 | Kozarekar et al. |
| 7,582,033 B2 | 9/2009 | Kefti-Cherif et al. |
| 7,753,147 B2 | 7/2010 | Usoro |
| 7,780,562 B2 | 8/2010 | King et al. |
| 8,143,735 B2 | 3/2012 | Bauer |
| 8,226,517 B2 | 7/2012 | Tsai et al. |
| 8,235,859 B2 | 8/2012 | Yun |
| 8,480,529 B2 | 7/2013 | Pohl et al. |
| 8,500,601 B2 | 8/2013 | Arnold et al. |
| 8,584,359 B1 | 11/2013 | Bowman |
| 8,727,944 B2 | 5/2014 | Noboru et al. |
| 8,734,281 B2 | 5/2014 | Ai et al. |
| 8,996,227 B2 | 3/2015 | Sisk et al. |
| 9,017,207 B2 | 4/2015 | Pohl et al. |
| 9,074,656 B2 | 7/2015 | Benz et al. |
| 9,145,136 B2 | 9/2015 | Suntharalingam et al. |
| 9,184,646 B2 | 11/2015 | Fulton |
| 9,261,064 B2 | 2/2016 | Patel et al. |
| 9,371,810 B2 | 6/2016 | Creviston |
| 9,421,855 B2 | 8/2016 | Suntharalingam et al. |
| 9,541,172 B1 | 1/2017 | Wright |
| 9,555,795 B2 | 1/2017 | Nefcy et al. |
| 9,676,265 B2 | 6/2017 | Choi |
| 9,726,282 B2 | 8/2017 | Pohl et al. |
| 9,829,103 B2 | 11/2017 | Volpert |
| 9,862,260 B2 | 1/2018 | Lee |
| 10,167,906 B2 | 1/2019 | Neelakantan et al. |
| 10,183,569 B2 | 1/2019 | Toyota et al. |
| 10,422,389 B2 | 9/2019 | Ebihara |
| 10,479,187 B2 | 11/2019 | Lubben et al. |
| 10,487,918 B2 | 11/2019 | Turner et al. |
| 10,518,626 B2 | 12/2019 | Pettersson |
| 10,519,920 B2 | 12/2019 | Patil et al. |
| 10,591,025 B2 | 3/2020 | Fliearman et al. |
| 10,619,711 B2 | 4/2020 | Fliearman et al. |
| 10,900,454 B1 | 1/2021 | Fliearman et al. |
| 2001/0019210 A1 | 9/2001 | Fukasaku et al. |
| 2001/0025621 A1 | 10/2001 | Shiraishi et al. |
| 2001/0042649 A1 | 11/2001 | Maeda et al. |
| 2002/0019284 A1 | 2/2002 | Aikawa et al. |
| 2002/0033059 A1 | 3/2002 | Pels |
| 2002/0117860 A1 | 8/2002 | Man et al. |
| 2002/0139592 A1 | 10/2002 | Fukasaku et al. |
| 2002/0177504 A1 | 11/2002 | Pels |
| 2003/0001391 A1 | 1/2003 | Kuang et al. |
| 2003/0104900 A1 | 6/2003 | Takahashi |
| 2003/0224888 A1 | 12/2003 | Wilder et al. |
| 2004/0055800 A1 | 3/2004 | Katou et al. |
| 2004/0116226 A1 | 6/2004 | Baker et al. |
| 2006/0111211 A1 | 5/2006 | Kefti-Cherif et al. |
| 2006/0154771 A1 | 7/2006 | Klemen et al. |
| 2006/0166777 A1 | 7/2006 | Aikawa et al. |
| 2007/0108006 A1 | 5/2007 | Schmid et al. |
| 2007/0157899 A1 | 7/2007 | Seufert et al. |
| 2007/0265126 A1 | 11/2007 | Janson et al. |
| 2008/0162007 A1 | 7/2008 | Ishii et al. |
| 2008/0179119 A1 | 7/2008 | Grenn et al. |
| 2008/0179159 A1 | 7/2008 | Pollman |
| 2008/0314195 A1 | 12/2008 | Andoh et al. |
| 2009/0055061 A1 | 2/2009 | Zhu |
| 2009/0176611 A1 | 7/2009 | Avery |
| 2009/0264241 A1 | 10/2009 | Dittrich et al. |
| 2009/0312145 A1 | 12/2009 | Pohl et al. |
| 2010/0029428 A1 | 2/2010 | Abe et al. |
| 2010/0044183 A1 | 2/2010 | Guggolz et al. |
| 2010/0048338 A1 | 2/2010 | Si |
| 2010/0063704 A1 | 3/2010 | Okubo et al. |
| 2010/0076634 A1 | 3/2010 | Brigham |
| 2010/0190602 A1 | 7/2010 | Wittkopp et al. |
| 2010/0234166 A1 | 9/2010 | Samie et al. |
| 2011/0010031 A1 | 1/2011 | Syed et al. |
| 2011/0015020 A1 | 1/2011 | Grosser |
| 2011/0053729 A1 | 3/2011 | Parsons et al. |
| 2011/0070999 A1 | 3/2011 | Soliman et al. |
| 2011/0152026 A1 | 6/2011 | Williams |
| 2011/0263379 A1 | 10/2011 | Liang et al. |
| 2012/0103293 A1 | 5/2012 | Robinette et al. |
| 2012/0165156 A1 | 6/2012 | Oguri |
| 2012/0235473 A1 | 9/2012 | Jiang et al. |
| 2012/0240723 A1 | 9/2012 | Gluckler et al. |
| 2012/0316026 A1 | 12/2012 | Oguri et al. |
| 2013/0046427 A1 | 2/2013 | Hohenberg |
| 2013/0252773 A1 | 9/2013 | Suntharalingam et al. |
| 2013/0316873 A1 | 11/2013 | Jansen et al. |
| 2014/0011619 A1 | 1/2014 | Pohl et al. |
| 2014/0128205 A1 | 5/2014 | Phillips et al. |
| 2014/0137824 A1 | 5/2014 | Jacques et al. |
| 2014/0150604 A1 | 6/2014 | Kaltenbach |
| 2014/0256490 A1 | 9/2014 | Honda |
| 2015/0143936 A1 | 5/2015 | Eo et al. |
| 2015/0226323 A1 | 8/2015 | Pohl et al. |
| 2015/0239335 A1 | 8/2015 | Wachter et al. |
| 2016/0031438 A1 | 2/2016 | Matsui et al. |
| 2016/0031439 A1 | 2/2016 | Nefcy et al. |
| 2016/0052382 A1 | 2/2016 | Clark et al. |
| 2016/0076629 A1 | 3/2016 | Modrzejewski et al. |
| 2016/0082821 A1 | 3/2016 | Mueller et al. |
| 2016/0096522 A1 | 4/2016 | Ortmann et al. |
| 2016/0137045 A1 | 5/2016 | Zhu et al. |
| 2016/0200311 A1 | 7/2016 | Nefcy et al. |
| 2016/0207525 A1 | 7/2016 | Nefcy et al. |
| 2016/0258495 A1 | 9/2016 | Bird |
| 2016/0288780 A1 | 10/2016 | Shukla et al. |
| 2016/0348741 A1 | 12/2016 | Niemiec et al. |
| 2017/0050508 A1 | 2/2017 | Pritchard et al. |
| 2017/0248196 A1 | 8/2017 | Turner et al. |

(56) References Cited

U.S. PATENT DOCUMENTS

| | | |
|---|---|---|
| 2017/0328470 A1 | 11/2017 | Pohl et al. |
| 2017/0368925 A1 | 12/2017 | Maki |
| 2018/0100564 A1 | 4/2018 | Fliearman et al. |
| 2018/0106365 A1 | 4/2018 | Tsukizaki et al. |
| 2018/0149247 A1 | 5/2018 | Rekow et al. |
| 2018/0172124 A1 | 6/2018 | Valente et al. |
| 2018/0186230 A1 | 7/2018 | Fukuda et al. |
| 2018/0236864 A1 | 8/2018 | Imamura et al. |
| 2018/0238443 A1 | 8/2018 | Aulin et al. |
| 2018/0244145 A1 | 8/2018 | Ohnemus et al. |
| 2018/0298993 A1 | 10/2018 | Fliearman et al. |
| 2019/0084555 A1 | 3/2019 | Omura et al. |
| 2019/0160936 A1 | 5/2019 | Lubben et al. |
| 2019/0176609 A1 | 6/2019 | Bando |
| 2019/0176806 A1 | 6/2019 | Trent |
| 2019/0219022 A1 | 7/2019 | Patil et al. |
| 2019/0344655 A1 | 11/2019 | Pettersson |
| 2019/0351751 A1 | 11/2019 | Sato et al. |
| 2020/0331337 A1 | 10/2020 | Fliearman et al. |
| 2020/0331338 A1 | 10/2020 | Fliearman et al. |
| 2020/0332754 A1 | 10/2020 | Fliearman et al. |
| 2020/0332756 A1 | 10/2020 | Fliearman et al. |
| 2020/0332757 A1 | 10/2020 | Fliearman et al. |
| 2020/0332864 A1 | 10/2020 | Fliearman et al. |
| 2020/0332865 A1 | 10/2020 | Fliearman et al. |
| 2020/0332866 A1 | 10/2020 | Fliearman et al. |
| 2020/0332867 A1 | 10/2020 | Fliearman et al. |
| 2020/0332868 A1 | 10/2020 | Fliearman et al. |
| 2021/0372503 A1 | 12/2021 | Fliearman et al. |
| 2021/0372504 A1 | 12/2021 | Fliearman et al. |
| 2022/0267990 A1 | 8/2022 | Fliearman et al. |
| 2022/0267991 A1 | 8/2022 | Dhanal et al. |

FOREIGN PATENT DOCUMENTS

| | | | | |
|---|---|---|---|---|
| DE | 3120675 | A1 | 2/1982 | |
| DE | 3444562 | A1 | 6/1985 | |
| DE | 69218975 | T2 | 6/1994 | |
| DE | 69008994 | T2 | 12/1994 | |
| DE | 10007959 | A1 | 9/1998 | |
| DE | 19745995 | A1 | 9/1998 | |
| DE | 19927521 | A1 | 6/2000 | |
| DE | 19911924 | A1 | 9/2000 | |
| DE | 19923316 | A1 | 11/2000 | |
| DE | 10003741 | A1 | 4/2001 | |
| DE | 10103726 | A1 | 8/2002 | |
| DE | 102006037576 | A1 | 4/2008 | |
| DE | 112007000573 | | 1/2009 | |
| DE | 102010007612 | | 10/2010 | |
| DE | 102010005178 | A1 * | 11/2010 | ............... F16H 3/66 |
| DE | 102010030570 | A1 | 12/2011 | |
| DE | 102010030571 | A1 | 12/2011 | |
| DE | 102010060140 | A1 | 4/2012 | |
| DE | 102011080068 | A1 | 1/2013 | |
| DE | 102011089708 | A1 | 6/2013 | |
| DE | 102011089709 | A1 | 6/2013 | |
| DE | 102011089710 | A1 | 6/2013 | |
| DE | 112011103973 | T5 | 10/2013 | |
| DE | 102008045202 | A1 | 3/2014 | |
| DE | 102013203009 | A1 | 8/2014 | |
| DE | 102013012747 | A1 | 9/2014 | |
| DE | 102013206970 | A1 | 10/2014 | |
| DE | 102013209022 | A1 | 11/2014 | |
| DE | 102014200720 | A1 | 2/2015 | |
| DE | 102014200723 | B3 | 2/2015 | |
| DE | 102013219948 | A1 | 4/2015 | |
| DE | 102014225298 | A1 | 7/2015 | |
| DE | 112014000378 | T5 | 9/2015 | |
| DE | 112014000411 | T5 | 10/2015 | |
| DE | 102017203026 | A1 | 8/2017 | |
| DE | 102017204269 | A1 | 9/2017 | |
| DE | 112016004789 | | 7/2018 | |
| DE | 102018122936 | A1 * | 3/2020 | |
| DE | 102019204909 | A1 | 10/2020 | |
| DE | 102020204705 | A1 | 10/2020 | |
| DE | 102020204795 | A1 | 10/2020 | |
| DE | 102022200804 | A1 | 8/2022 | |
| EP | 384808 | | 9/1991 | |
| EP | 645271 | B1 | 3/1995 | |
| EP | 391386 | | 9/1995 | |
| EP | 2272702 | A2 | 1/2011 | |
| EP | 2664785 | | 11/2013 | |
| EP | 1069310 | B4 | 3/2014 | |
| GB | 650564 | | 2/1951 | |
| GB | 2506199 | A | 3/2014 | |
| JP | H04296649 | A | 10/1992 | |
| JP | 2003267079 | A | 9/2003 | |
| JP | 2015116004 | A | 6/2015 | |
| WO | 1999023398 | | 5/1999 | |
| WO | 0188369 | A1 | 11/2001 | |
| WO | 2007107458 | | 9/2007 | |
| WO | 2012078203 | A1 | 6/2012 | |
| WO | WO-2018028745 | A1 * | 2/2018 | |

OTHER PUBLICATIONS

German Search Report issued in application No. DE102022200804.9 dated Sep. 22, 2022 with machine translation (20 pages).
German Search Report issued in application No. DE102022200825.1 dated Sep. 27, 2022 with machine translation (26 pages).
Non-Final Office Action issued in U.S. Application No. 17/,216,243 dated Dec. 13, 2022, 22 pages.
USPTO non-final office action issued in pending Utility U.S. Appl. No. 16/887,973 dated Jan. 31, 2022.
German Search Report issued in application No. DE102022206133.0 dated Oct. 12, 2022 (12 pages).
NTN Automotive Sales Headquarters, Compact Clutch Integrated Pulley for Alternators, NTN Technical Review No. 75, 2007.
Harmonic Drive LLC, Harmonic Planetary Precision Gearing & Motion Control, Product Brochure, Mar. 2006.
Ioan-Adrian Viorel et al., Integrated Starter-Generators For Automotive Applications, Technical University of Cluj-Romania, Dept. of Electrical Machines, vol. 45, No. 3, 2004.
North Atalantic Starter, Starter Drives Explained, Northatlan.com, 2005.
German Search Report for application No. 1020172030267 dated Aug. 4, 2017.
German Search Report for application No. 1020182189080 dated May 27, 2019.
German Search Report for application No. 1020182214956 dated May 28, 2019.
German Search Report for application No. 1020182180784 dated Jun. 4, 2019.
German Search Report for application No. 1020202046468 dated Sep. 1, 2020.
German Search Report for application No. 1020202047057 dated Sep. 1, 2020.
German Search Report for application No. 1020202047952 dated Sep. 2, 2020.
German Search Report for application No. 1020202047049 dated Sep. 3, 2020.
German Search Report for application No. 1020202047065 dated Sep. 3, 2020.
German Search Report for application No. 1020202046433 dated Sep. 4, 2020.
German Search Report for application No. 1020202030634 dated Sep. 4, 2020.
German Search Report for application No. 1020202046425 dated Sep. 4, 2020.
USPTO Final Office Action dated Mar. 8, 2019 for Utility U.S. Appl. No. 15/056,767.
USPTO Final Office Action dated Jun. 11, 2018 for Utility U.S. Appl. No. 15/056,767.
USPTO Non-Final Office Action dated Sep. 9, 2019 for Utility U.S. Appl. No. 15/834,356.
USPTO Non-Final Office Action dated Nov. 2, 2017 for Utility U.S. Appl. No. 15/056,767.
USPTO Non-Final Office Action dated Sep. 28, 2018 for Utility U.S. Appl. No. 15/056,767.

(56) References Cited

OTHER PUBLICATIONS

USPTO Non-Final Office Action dated Nov. 1, 2018 for Utility U.S. Appl. No. 15/825,520.
USPTO Non-Final Office Action dated Feb. 25, 2019 for Utility U.S. Appl. No. 15/834,356.
USPTO Non-Final Office Action dated Mar. 4, 2020 for Utility U.S. Appl. No. 16/385,934.
USPTO Non-Final Office Action dated Jun. 19, 2020 for Utility U.S. Appl. No. 16/386,075.
USPTO Non-Final Office Action dated Aug. 24, 2020 for Utility U.S. Appl. No. 16/385,964.
USPTO Non-Final Office Action dated Aug. 24, 2020 for Utility U.S. Appl. No. 16/385,784.
USPTO Non-Final Office Action dated Dec. 7, 2020 for Utility U.S. Appl. No. 16/385,860.
USPTO Non-Final Office Action dated Oct. 30, 2020 for Utility U.S. Appl. No. 16/386,052.
Deere & Company, Utility U.S. Appl. No. 17/032,114, filed Sep. 25, 2020.
Deere & Company, Utility U.S. Appl. No. 16/887,973, filed May 29, 2020.
Deere & Company, Utility U.S. Appl. No. 16/887,998, filed May 29, 2020.
Deere & Company, Utility U.S. Appl. No. 17/080,562, filed Oct. 26, 2020.
Deere & Company, Utility U.S. Appl. No. 17/185,692, filed Feb. 25, 2021.
Deere & Company, Utility U.S. Appl. No. 17/185,713, filed Feb. 25, 2021.
Deere & Company, Utility U.S. Appl. No. 17/216,243, filed Mar. 29, 2021.
Deere & Company, Utility U.S. Appl. No. 17/325,437, filed May 20, 2021.
USPTO non-final office action issued in pending Utility U.S. Appl. No. 17/080,562 dated Dec. 6, 2021.
German Search Report issued in application No. DE 102021209339.6 dated Feb. 15, 2022 with translation, 17 pages.
German Search Report issued in German Application No. 102021113913.9 dated Sep. 30, 2021. (8 pages).
German Search Report issued in German Application No. 102021113924.4 dated Sep. 30, 2021. (7 pages).
USPTO Non-Final Office Action issued in U.S. Appl. No. 17/325,437 dated Feb. 9, 2023 9 pages.
German Search Report issued in application No. DE 102022203350.7 dated Jan. 17, 2023 with translation 12 pages.
USPTO Non-Final Office Action issued in U.S. Appl. No. 17/185,692 dated Apr. 21, 2023 9 pages.

\* cited by examiner

WORK VEHICLE MULTI-SPEED DRIVE ASSEMBLY PROVIDING MULTIPLE GEAR RATIOS AT SAME STEP RATIO

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicle drive systems, including drive assemblies for effecting multi-speed rotational outputs in either clock direction in which a same step ratio is provided between each gear ratio effecting the different rotational outputs.

BACKGROUND OF THE DISCLOSURE

Work vehicles, such as those used in the agriculture, construction and forestry industries, and other conventional vehicles, may be powered by an internal combustion engine (e.g., a diesel engine) and/or one or more electric power sources (e.g., electric motors). Various drive arrangements may be employed in the vehicle to effect power transfer from the prime or secondary power sources. For example, the vehicle power and drive line may include one or more drive assemblies to effect one or more output speeds for operating certain vehicle components. For example, wheel end drives, final drives and the like may provide one or more gear ratios to transfer terminal or near terminal power to the tractive ground-engaging wheels or tracks of the vehicle. Efficient and smooth operation through the speed and torque ranges required of such drives is desirable.

SUMMARY OF THE DISCLOSURE

This disclosure provides a multi-speed drive assembly such as may be used in work vehicles (e.g., as tractive wheel drives).

In one aspect, the disclosure provides a drive assembly for a work vehicle including a housing arrangement having at least one housing element forming a reaction member, a drive shaft rotatable on a drive axis relative to the reaction member in a first clock direction and alternatively a second clock direction, and a planetary gear set coupled to the drive shaft and configured to selectively rotate an output element in the first clock direction and alternatively in the second clock direction. The planetary gear set is a two-stage planetary gear set having a first-stage sun gear, a first-stage carrier, a set of first-stage planet gears supported on the first-stage carrier, a first-stage ring gear, a second-stage sun-gear rotationally fixed to the first-stage carrier, a second-stage carrier rotationally fixed to the first-stage ring gear, a set of second-stage planet gears supported on the second-stage carrier, and a second-stage ring gear, wherein the output element rotates with the second-stage carrier. The drive assembly also includes a first clutch arrangement configured to selectively engage the planetary gear set to effect a first gear ratio and first output rotation speed and torque of the output element, and a second clutch arrangement configured to selectively engage the planetary gear set to effect a second gear ratio and second output rotation speed and torque of the output element, wherein a step ratio from the first gear ratio and the second gear ratio is 3:1. The drive assembly further includes at least one first actuator configured to effect movement of the first clutch arrangement along the drive axis to selectively engage the planetary gear set, and at least one second actuator configured to effect movement of the second clutch arrangement along the drive axis to selectively engage the planetary gear set. The drive shaft and the output element rotate in a same clock direction with the first clutch arrangement engaged with the planetary gear set, and the drive shaft and the output element rotate in opposite clock directions with the second clutch arrangement engaged with the planetary gear set.

In another aspect, the disclosure provides a drive assembly for a work vehicle including a housing arrangement having a first housing element, a second housing element, a first hub and a second hub forming a stationary reaction member, a drive shaft rotatable about a drive axis relative to the stationary reaction member in a first clock direction and alternatively in a second clock direction and a planetary gear set coupled to the drive shaft. The planetary gear set includes a first-stage sun gear, a first-stage carrier, a set of first-stage planet gears supported on the first-stage carrier, a first-stage ring gear, a second-stage sun-gear rotationally fixed to the first-stage carrier, a second-stage carrier rotationally fixed to the first-stage ring gear, a set of second-stage planet gears supported on the second-stage carrier, and a second-stage ring gear. The drive assembly also includes an output element rotatable with the second-stage carrier in the first clock direction and alternatively in the second clock direction to output rotational speed and torque, a low clutch arrangement coupled to the first hub and configured to selectively engage the second-stage ring gear to effect a low mode in which the planetary gear set provides a low gear ratio, the drive shaft rotates in the second clock direction, and the output element rotates in the second clock direction, a mid clutch arrangement coupled to the second hub and configured to selectively engage the first-stage carrier to effect a mid mode in which the planetary gear set provides a mid gear ratio at a step ratio of 3:1 to the low gear ratio, the drive shaft rotates in the first clock direction and the output element rotates in the second clock direction, and a high clutch arrangement coupled to the drive shaft and configured to selectively engage the first-stage carrier to effect a high mode in which the planetary gear set provides a high gear ratio at a step ratio of 3:1 to the mid gear ratio, the drive shaft rotates in the second clock direction and the output element rotates in the second clock direction.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
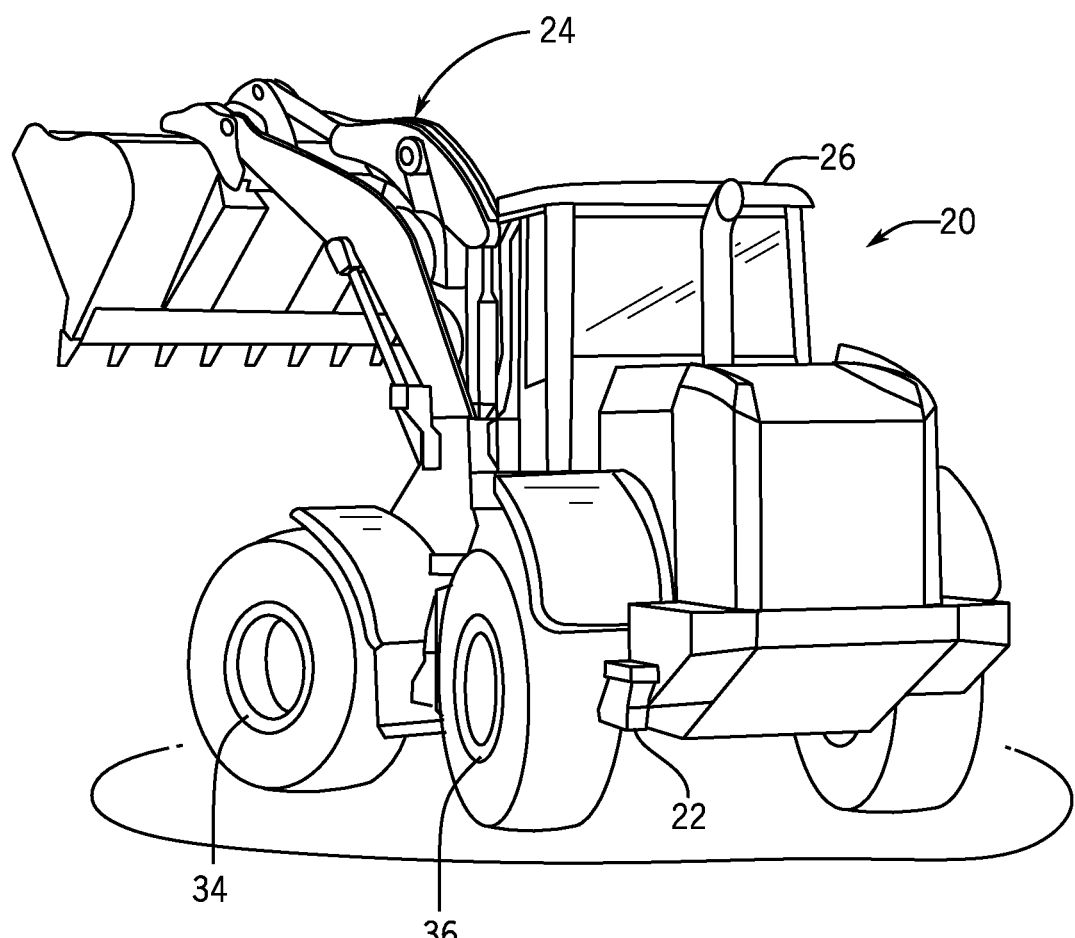
FIG. 1 is a schematic side view of an example work vehicle in the form of a wheel loader in which the disclosed drive assembly may be employed.

The following describes one or more example embodiments of the disclosed bi-directional drive assembly, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, the term "axial" refers to a dimension that is generally parallel to an axis of rotation, axis of symmetry, or centerline of a component or components. For example, in a cylinder or disc with a centerline and opposite, generally circular ends or faces, the "axial" dimension may refer to the dimension that generally extends in parallel to the centerline between the opposite ends or faces. In certain instances, the term "axial" may be utilized with respect to components that are not cylindrical (or otherwise radially symmetric). For example, the "axial" dimension for a rectangular housing containing a rotating shaft may be viewed as a dimension that is generally in parallel with the rotational axis of the shaft. Furthermore, the term "radially" as used herein may refer to a dimension or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial dimension. Additionally, the term "circumferential" may refer to a collective tangential dimension that is perpendicular to the radial and axial dimensions about an axis.

OVERVIEW

Generally, the disclosure provides a drive assembly that is selectively or alternatively operable in either rotational clock direction at the input and output sides of the drive assembly. Without changing internal or external components, the drive assembly may receive rotational input power and transmit rotational output power in either clock direction, as desired, using the drive signal to the power source (e.g., electric machine) to control output rotation direction. Multiple such drive assemblies with common internal and external hardware may thus be employed for oppositely facing shafts that are required to rotate in opposite clock directions to collectively effect one motion of the vehicle or subsystem thereof, such as to provide a tractive force in opposite clock directions to ground-engaging wheels or tracks at opposite sides of the vehicle to collectively propel the vehicle either in a forward or the rearward travel direction. In one example implementation, the bi-directional drive assembly may be employed in a common configuration for wheel end drive units for all wheels of the vehicle.

In certain embodiments, the drive assembly is or includes a power transmission assembly with a gear set that is driven by a power source, such as one or more electric machines or hydraulic motors. The gear set transmits rotational power from the power source to a rotating output member. The output member may be an intermediate component or tied directly to the driven component. The gear set may effect a ratio change between the input power source and the output member, directly transmit the power without a change in ratio, or a combination thereof. The output member may thus rotate at the same speed as, or one or more different speeds than, the input power source or input shaft. The gear set may take any of various forms including arrangements with enmeshing spur or other gears as well as arrangements with one or more planetary gear sets. Large gear reduction ratios may be achieved by the drive assembly such that a single electric machine or hydraulic motor may be used and operated at suitable speeds for one or more speed and torque outputs. However, multiple electric machines or hydraulic motors may power the drive assembly.

Further, in certain embodiments, the drive assembly may automatically and/or selectively shift gear ratios (i.e., shift between power flow paths having different gear ratios). The drive assembly may include one or more active engagement components that engage or disengage to effect power transmission through a power flow path. In this manner, clutch configurations may be employed to carry out the ratio changes with appropriate control hardware and logic. In various embodiments, the clutch arrangements may have one or more positive interlocking shifting type clutches, possibly referred to as "dog" clutches, in which raised features (e.g., axially extending projections) of the clutches engage and disengage corresponding raised features or move into and out of corresponding recesses in mating components of the gear set. In the case of male/female mating features, a reverse relationship may exist (e.g., the clutches define the recesses receiving raised projections of the gear set). Moreover, one or more clutches may serve to engage and disengage interlocking features of two or more components of a planetary gear set, such that one or more clutch components do not have interlocking features themselves.

In certain embodiments, the drive assembly may include clutch arrangements with multiple clutches (or clutch rings) that selectively interface with a stationary reaction member or the drive assembly (e.g., a component fixed relative to or a part of a drive housing thereof). Selective engagement and disengagement of the clutch arrangements with a planetary gear set grounds one or more components thereof to effect one or more gear ratios and corresponding output rotation speeds and torques. The clutch arrangements may be permanently coupled to the reaction member such that actuating components may be fixedly mounted to the drive assembly without the need for actuation of moving gear set components and the corresponding service lines (e.g., hydraulic passages or lines). Actuation components may also be mounted fixed relative to the reaction member to further reduce or eliminate service lines to non-stationary components. Selective engagement of the multiple clutch elements by the actuation components thereby allows the drive assembly to output multiple output speeds and torques.

In one example, the clutch arrangements include first, second, and third clutch arrangements selectively actuated to engage a planetary gear set. Engagement of the first clutch arrangement grounds a component of the planetary gear set to effect a first gear ratio and output rotation speed and torque. Engagement of the second clutch arrangement grounds another component of the planetary gear set to effect a second gear ratio and output rotation speed and torque. Engagement of the third clutch arrangement rotationally fixes components of the planetary gear set to the drive shaft to effect a third gear ratio and output rotation speed and torque. Such a multi-speed drive assembly may thus effect three speeds by selectively grounding or fixing different components of the planetary gear set.

In one or more further examples, the planetary gear set may be a compound planetary gear set including two stages having a first-stage sun gear coupled to the drive shaft, a first-stage carrier, a set of first-stage planet gears supported on the first-stage carrier, a first-stage ring gear, a second-stage sun gear coupled to the first-stage carrier, a second-stage carrier coupled to the first-stage ring gear, a set of second-stage planet gears supported on the second-stage carrier, and a second-stage ring gear. The second-stage carrier is coupled to an output element such that that output element rotates with the second-stage carrier to output different rotational speeds and torques. The first clutch arrangement selectively engages the second-stage ring gear to ground the second-stage ring gear and effect the first gear ratio to output the first rotation speed and torque. The second clutch arrangement selectively engages the first-stage carrier to ground the first-stage carrier and effect the second gear ratio to output the second rotation speed and torque. The third clutch arrangement selectively engages the first-stage stage carrier to rotationally fix the first-stage carrier to the drive shaft, which in turn, rotationally fixes the components of the planetary gear set and effects the third gear ratio to output the third rotational speed and torque.

In certain embodiments, the actuation arrangement includes a number of electromechanical or electromagnetic solenoid actuators (that convert electrical energy into a mechanical linear push and/or pull force) that function to engage and/or disengage the clutch arrangements. In one example, one or more solenoid actuators may be used to reposition each individual clutch ring of a particular clutch arrangement, such that at least two solenoid actuators are used to reposition paired or bifurcated clutch rings of a clutch arrangement. Different types of actuators may be used in combination to reposition one or more clutch rings of the clutch arrangements. Various implementations are encompassed by this disclosure.

As used herein with respect to the solenoid and other type of actuators, the term "activated" or "energized" refers to a command that results in the associated solenoid moving its armature by the application of electromagnetic force. In one example, an energize command for the solenoids results in the respective armatures being pushed out of or pulled into the solenoids, which may occur from applying a current to a coil within the solenoid to push or pull the armature out of/into the solenoid. It is also possible to operate the solenoids by discontinuing current to the coil such that a spring pushes/pulls the armature relative to the solenoid coil.

According to one example, the drive assembly herein is configured for operation in three modes each providing a different gear ratio based on selective actuation of the clutch arrangements to interact with the gear set. Thus, the first mode provides a first gear ratio, the second mode provides a second gear ratio and the third mode provides a third ratio. Each gear ratio shift may be provided with a step ratio of 3:1. For example, the first gear ratio may be 9:1, the second gear ratio may be 3:1 and the third gear ration may be 1:1. Additionally, in the first mode, the input rotation and output rotation may be in the same direction, i.e., one of the first clock direction and the second clock direction. In the second mode, the clock direction of the input rotation is reversed such that the input rotation is in a clock direction opposite of the output rotation. In the third mode, the clock direction of the input rotation is reversed again, such that the input rotation and output rotation are in the same clock direction. In this manner, smooth and consistent gear shifting may be provided. In addition, an input rotation may alternate clock (rotational) directions with each gear ratio shift, while an output rotation may continue in the same clock direction with each gear ratio shift. Each of the three modes may operate in a forward and reverse mode as well, such the output rotation in the reverse mode is in an opposite direction of the output rotation in the forward mode.

The drive assembly disclosed herein may be useful for any number of work or conventional vehicle applications. In the work vehicle context, the drive assembly may power various sub-systems including various aspects of the power and drive trains of the vehicle. As one example, the drive assembly may be or be incorporated into a wheel drive for providing tractive power to the ground-engaging wheels or tracks of the vehicle. The drive assembly may be incorporated into the power and drive train at an intermediate location between the wheels/tracks and the prime mover or transmission, or it may be at the wheel/track ends (e.g., one at each ground-engaging wheel or track) in which case the drive assembly may be considered a "final drive" that couples directly or through a downstream gearset to the wheel or track carrying hub. In such a case when the drive assembly is remote from the prime mover, a secondary power source, such as one or more electric machines or hydraulic motors provide the immediate power input to the drive assembly.

The following describes one or more example implementations of the disclosed drive assembly. Discussion herein may sometimes focus on the example application of a wheel end drive assembly of a wheel loader, but the disclosed drive assembly is suitable for other types of components and work vehicles, including various other construction machines (e.g., crawlers, motor graders, dump trucks) as well as various agriculture or forestry machines (e.g., combines, harvesters, balers, mowers, forwarders, forestry skidders and so on) and utility vehicles.

DESCRIPTION

Figure 2A:
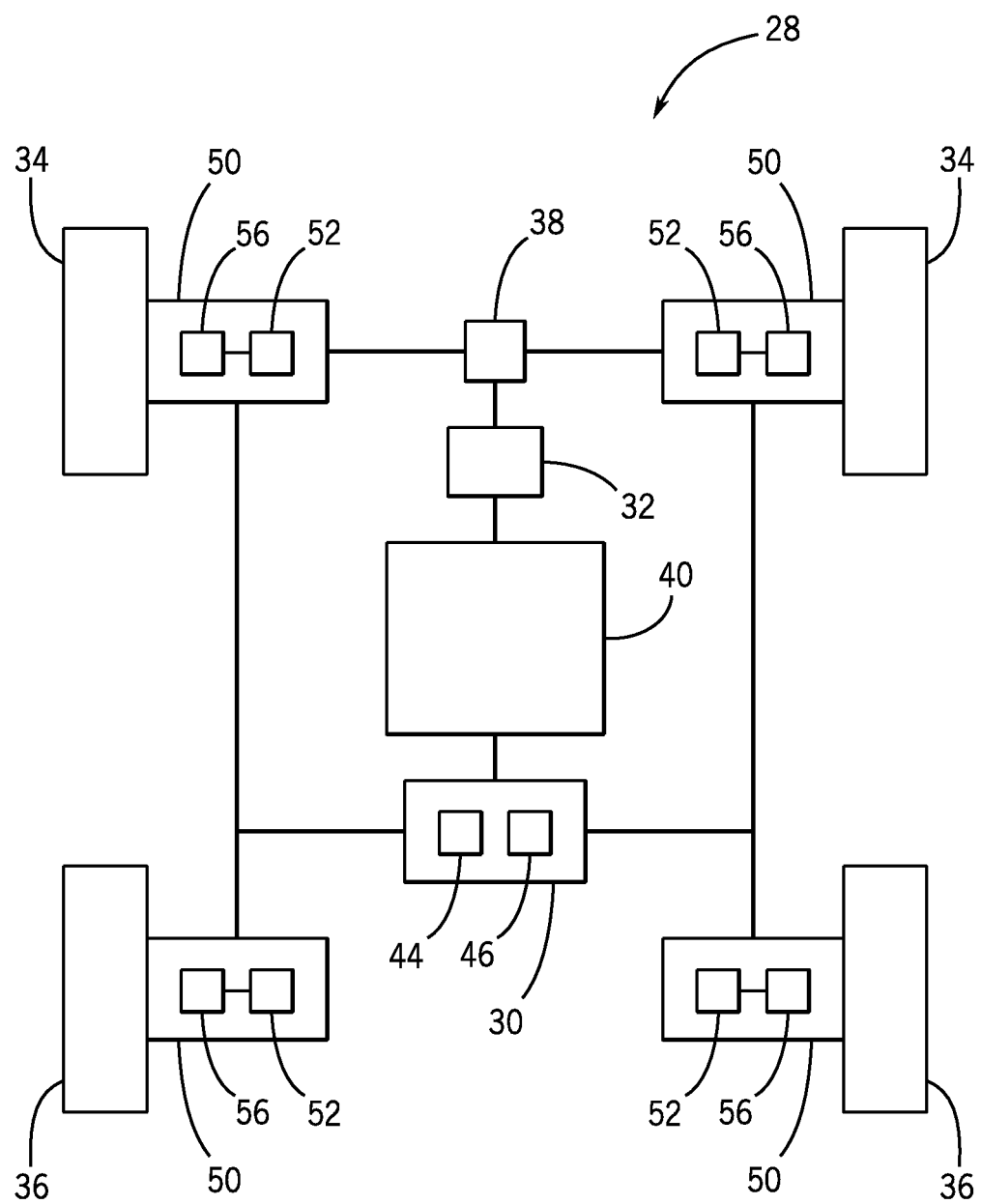
FIG. 2A is a schematic diagram of certain components of a power and drive train for the example work vehicle of FIG. 1.

Referring to FIGS. 1 and 2A, in some embodiments, the disclosed work vehicle 20 may be a wheel loader although, as noted, the drive assembly described herein may be applicable to a variety of machines. As shown, the work vehicle 20 may be considered to include a structural main frame or chassis 22 supporting a work implement 24 that is selectively positioned by various combinations of structural elements (e.g., arms, crossbars, pivot joints, etc.) and controllably moved utilizing any number of actuators, such as hydraulic cylinders. The work vehicle 20 may further be considered to include an operator cabin 26, a power and drive train 28, a control system 30, and a hydraulic system 32. The work vehicle 20 may be supported off the ground by ground-engaging wheels or tracks. In the illustrated example, the work vehicle 20 includes a front axle with steerable front wheels 34 (one at each left or right lateral side of the work vehicle 20) and a rear axle with non-steerable rear wheels 36 (one or more at each left or right side of the work vehicle 20).

Referring further to FIG. 2A, the power and drive train 28 has wheel steering components 38, including various devices (e.g., power steering pumps and lines, steering mechanisms, and the like) that couple manual (e.g., operator steering controls or wheel) and/or automated (via the control system 30) steering input to the wheels, such as the steerable wheels 34. The power and drive train 28 includes a prime mover, such as an engine 40, which supplies power to the work vehicle 20, as either direct mechanical power or after being converted to electric or hydraulic power. In one example, the engine 40 is an internal combustion engine, such as a diesel engine, having an engine shaft for outputting mechanical power. The engine 40 is controlled by an engine control module (not shown) of the control system 30. It should be noted that the use of an internal combustion engine is merely an example, as the prime power source may one or more fuel cells, electric motors, hybrid-gas electric motors, or other power-producing devices.

The engine 40 provides power to onboard mechanical, electrical and hydraulic subsystems of the work vehicle 20 governing such things as tractive power to propel the work vehicle 20 and for off-boarding power to other sub-systems remote from the work vehicle 20. For example, the engine 40 may provide mechanical power that is converted to an electric format to run the electronics of the control system 30 and one or more electric drives of the work vehicle 20. The control system 30 thus may have mechanical to electrical power conversion components 44, one or more batteries 46, and associated electronics, including various alternators, generators, voltage regulators, rectifiers, inverters, and the like. The control system 30 may be configured as a computing device or electronic control unit (ECU) with associated processor devices and memory architectures, as a hard-wired computing circuit (or circuits), as a programmable circuit, as a hydraulic, electrical, or electro-hydraulic controller.

The control system 30 may be configured to execute various computational and control functionality with respect to the work vehicle 20, including various devices associated with the power and drive train 28, the hydraulic system 32, and various additional components of the work vehicle 20. In some embodiments, the control system 30 may be configured to receive input signals in various formats (e.g., as hydraulic signals, voltage signals, current signals, and so on), and to output command signals in various formats (e.g., as hydraulic signals, voltage signals, current signals, mechanical movements such as rotation, and so on). The control system 30 is configured to operate various aspects of the disclosed drive assembly, including electromechanical actuators (e.g., solenoids), which may form part of the power and drive train 28 or part of another subsystem of the work vehicle 20.

In some embodiments, the control system 30 may include or be configured to receive input commands from, or otherwise interface with, a human-machine interface or operator interface (not shown) and various sensors, units, and systems onboard or remote from the work vehicle 20. In response, the control system 30 may generate one or more types of commands for implementation by various systems of the work vehicle 20. The control system 30 may additionally or alternatively operate autonomously without input from a human operator, communicating with other systems or devices (including other controllers) in various known ways, including via a CAN bus (not shown), via wireless or hydraulic communication means, or otherwise. In one example and as discussed in greater detail below, the control system 30 may command current to electromagnets associated with an actuator assembly to engage and/or disengage clutches within the drive assembly.

The engine 40 may also provide mechanical power that is converted to hydraulic format to power various hydraulic drives, pumps and compressors that pressurize fluid to drive various actuators of the hydraulic system 32 in order to power components of the work vehicle 20, such as the work implement 24, wheel steering and braking, a tow-behind work implement (not shown), or the like. In this example, the work vehicle 20 supports the mounting of the work implement 24 as a loader with linkage boom arms and a bucket that may be raised and lowered during operation by one or more hydraulic piston-cylinder devices. The hydraulic system 32 may be coupled to and operated by the control system 30 autonomously or in response to commands from an operator input device (e.g., operator controls, operator display device, etc.) in the cabin 26 or remote from the work vehicle 20. The hydraulic system 32 may include other components (e.g., valves, flow lines, pistons/cylinders, seals/gaskets, and so on), such that control of various devices may be effected with, and based upon, hydraulic, mechanical, or other signals and movements.

As noted above, the drive assembly of this disclosure may be implemented in various subsystems within the work vehicle context and may be powered in one or more formats. The following describes one example drive assembly implemented as, and incorporated within, an electric wheel end drive 50. One such wheel end drive 50 is installed just upstream from each of the four wheels 34, 36 of the work vehicle 20. Each wheel end drive 50 itself, or one or more components thereof, may thus be considered a "final" drive due to its location proximate the associated wheel 34, 36 and its functioning to provide the last or nearly last gear ratio for the associated wheel 34, 36. The wheel end drives 50 may differ at each or pairs (e.g., front and rear) of the wheels 34, 36. However, due to the bi-directional functionality of the drive assembly, the wheel end drives 50 are identical for all wheels 34, 36, and as such, only one will be detailed below. Moreover, while the example wheel end drive 50 is electric, it may be operated by a different input power format (e.g., hydraulic or mechanical). The example wheel end drive 50 is also described herein as having multiple (e.g., two) electric machines for input power. However, the wheel end drive 50 may be operated with one or more than two electric machines. In the former case, intermediate input gearing may be utilized or omitted depending on the operating parameters (e.g., speed and torque) of the electric machine and/or the drive assembly itself and the wheels 34, 36. As will be described, intermediate input gearing is used to couple power to the drive assembly when two or more electric machines are employed. Additionally, the example wheel end drive 50 is a multiple-mode drive operable to output multiple speed and torque ranges for tractive power to the wheels 34, 36. Thus, while the engine 40 supplies prime power for the electric machine(s), the wheel end drives 50 are the direct power (and speed and torque) influencers to the wheels 34, 36, such that a central range transmission, axles or other upstream speed- and torque-changing gearing may be, and in the example implementation is, omitted from the work vehicle 20.

Figure 2B:
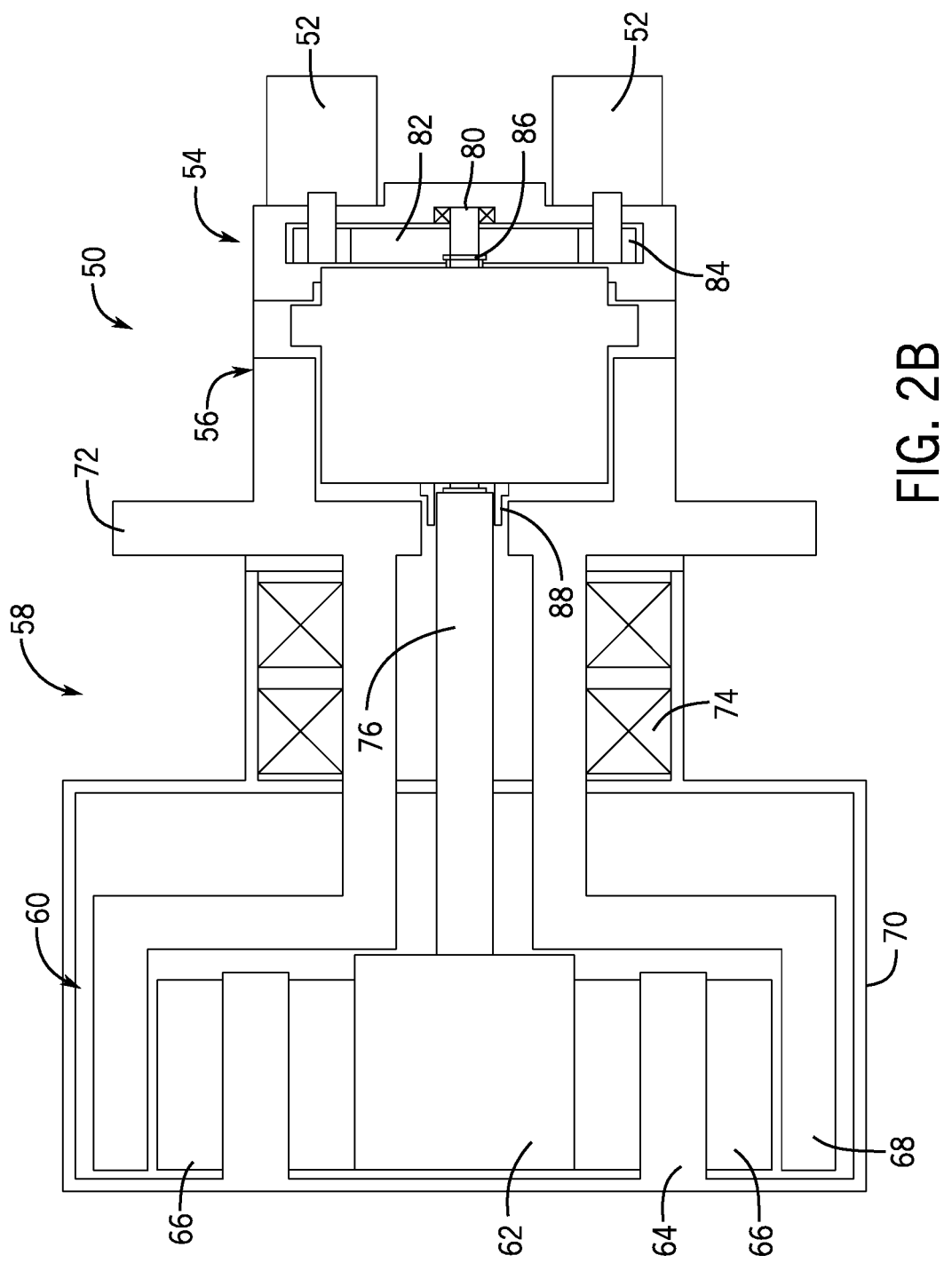
FIG. 2B is a schematic diagram of an example wheel end drive implementation of the disclosed drive assembly that may be incorporated in the example work vehicle of FIG. 1.

Referring also to FIG. 2B, the example wheel end drive 50 includes as principal components the input power sources in the form of two electric machines 52 that couple via an input gear set 54 to a drive assembly 56, which in turns couples to and drives one of the wheels 34, 36 via an outboard wheel end 58. The outboard wheel end 58 may be configured in any way suitable to mount the associated wheel 34, 36. Depending on speed and torque requirements of the wheel end drive 50, the outboard wheel end 58 may contain an outboard gear set, such as a single stage planetary gear set 60 having a sun gear 62 and a carrier 64 that supports planet gears 66 that mesh with a ring gear 68. The carrier 64 may be fixed to a wheel hub (not shown) of the associated wheel 34, 36 directly, or the carrier 64 may be contained within an outboard wheel end housing 70 that couples to the wheel hub. The ring gear 68 may be fixed to or formed integral with a mounting flange 72. The example outboard gear set 60 is a sun-in, carrier out planetary arrangement, although various other configurations are envisioned, including the omission of an outboard gear set or the carrier and/or the outboard wheel end housing 70 being formed by or directly coupled to the wheel hub of the wheel 34, 36. The wheel end drive 50 is assembled to the vehicle chassis 22, such as by the mounting flange 72, in a fixed orientation in the case of the rear wheels 36 or pivotally, about an upright, generally vertical or vertically canted, steering axis (not shown), in the case of the steered front wheels 34. One or more wheel bearings 74 allow the carrier 64 and/or outboard wheel end housing 70 to rotate relative to the vehicle chassis 22 about a generally lateral, or side to side, fixed or pivotal drive or rotation axis. The outboard wheel end 58 rotates about the rotation axis under power output from the drive assembly 56 via output shaft 76 coupled to or formed integrally with the sun gear 62 of the outboard planetary gear set 60. The drive assembly 56 is powered through an input shaft 80 splined to a central input gear 82, which meshes with relatively small diameter shaft gears 84 rotated by the electric machines 52. As noted, the input side of the wheel end drive 50 may be implemented in various ways, including with a different input gear set (e.g., a different axial gear set or a single or double stage planetary gear set), by a single electric machine with or without an input gear set (e.g., direct shaft mounting of the electric machine to the drive assembly), by more than two electric machines with a modified input gear set of any suitable axial, planetary or other gear configuration, and by a power source of a different format (e.g., mechanical or hydraulic). The input side as well as the outboard wheel end 58 of the wheel end drive 50 may be configured as needed to provide a 1:1 or other gear ratio between the electric machines 52 and the drive assembly 56 and between the drive assembly 56 and the wheel hub as needed depending, at least in part, on the desired speed and torque at the wheel 34, 36 and the speed and torque capacity of the electric machines 52.

The drive assembly 56 of the present embodiments generally includes actuators, clutch arrangements and a gear set within a housing. The drive assembly 56 operates to transfer power (rotational speed and torque) from the electric machines 52 to the outboard wheel end 58 at each wheel 34, 36 at multiple gear ratios that are selected based on the status of the clutch arrangements, which are controlled by the actuators based on signals from the control system 30. In this example, the drive assembly 56 transfers power from an input element 86 coupled to the electric machines 52 to an output element 88 coupled to the outboard wheel end 58, generally along a rotation axis.

Referring now to FIGS. 3-18, the following details the example drive assembly 56 of the wheel end drive 50. The example drive assembly 56 is a three-speed drive including direct or high drive modes in each clock direction, in which a 1:1 gear ratio is achieved through which the input and output speeds and torques match, and two other modes in each clock direction in which gear ratios are achieved to effect different output speeds and torques relative to the input power. The example drive assembly 56 effects low, mid and high modes. In each clock direction, the high mode is the direct drive mode and has a higher speed and lower torque than the mid mode, which has a higher speed and lower torque than the low mode.

Figure 3:
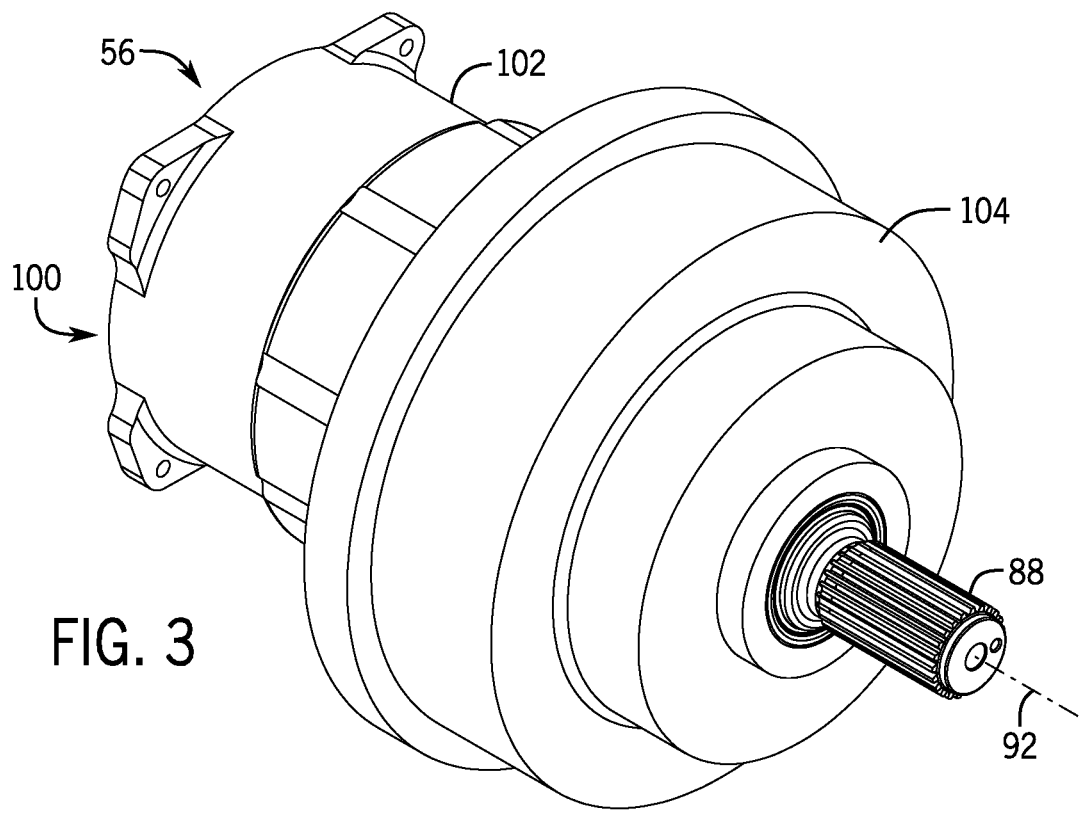
FIG. 3 is a first isometric side view of the drive assembly that may be implemented in the work vehicle of FIG. 1.
Figure 4:
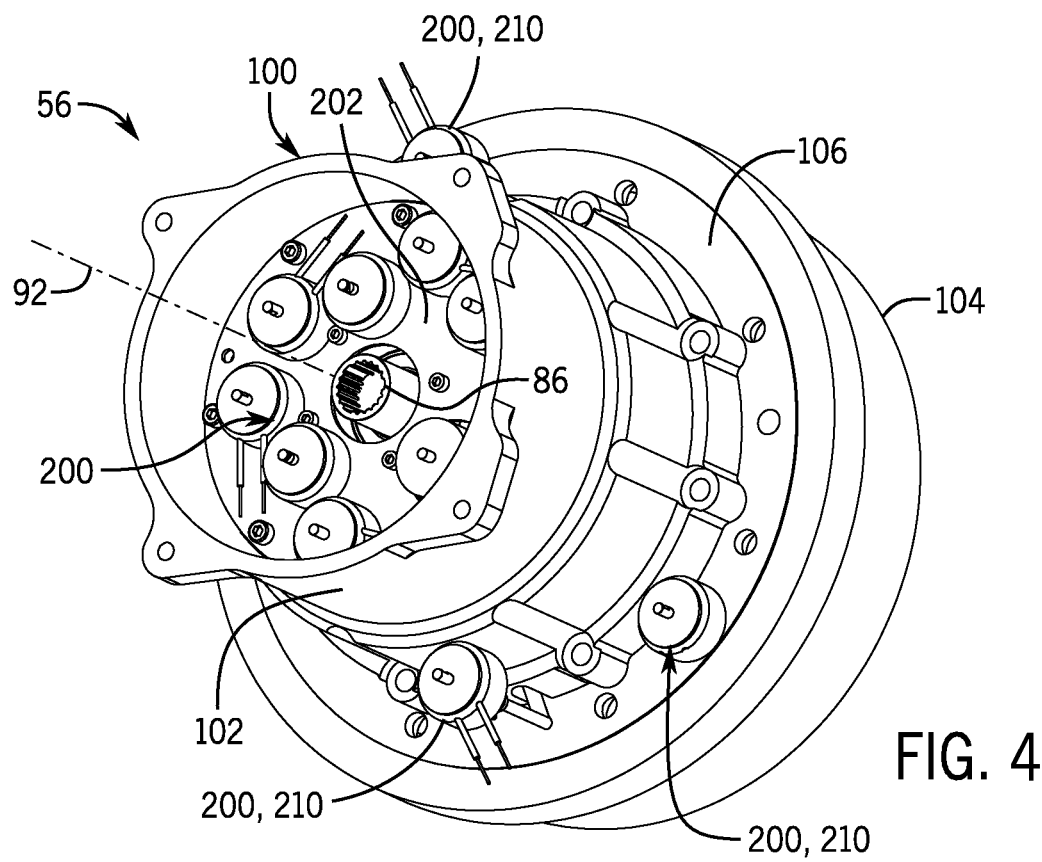
FIG. 4 is a second isometric side view of the drive assembly that may be implemented in the work vehicle of FIG. 1.

With reference to FIGS. 3 and 4, the drive assembly 56 generally includes a housing arrangement 100, which is formed by a number of housing elements including, for example, a first housing element 102 and a second housing element 104. The housing arrangement 100 also includes a first hub 106 arranged at least partially between the first housing element 102 and the second housing element 104 and may be considered a housing element as well. The housing elements 102, 104 are configured to house portions of one or more clutch arrangements, one or more actuators and/or a gear set. In addition, a drive shaft 90 (see, e.g., FIG. 8) extends within the housing arrangement 100 and is configured to rotate relative to at least one of the housing elements 102, 104 on a drive axis 92.

At least one housing element 102, 104 forms a reaction member. In one example, the first housing element 102 forms a reaction member, and as such, is fixed axially and radially with respect to the rotation axis (i.e., the drive axis 92), such that at least in the case of the rear non-steered wheels, the first housing element 102 is fixed relative to the work vehicle chassis 22. Thus, the first housing element 102, and certain other fixed components, may serve as reaction members against which certain forces effected by non-fixed components of the drive assembly 56 are applied. In the example drive assembly 56, the first housing element 102 forms a reaction member against which reaction forces from the clutch arrangements apply directly or indirectly. Thus, the first housing element 102 itself is considered a "reaction member" as used herein for its direct and indirect backstop of applied forces. Moreover, the second housing element 104 and a first hub 106 are stationary housing elements and may also be considered reaction members or portions of a reaction member.

Figure 5:
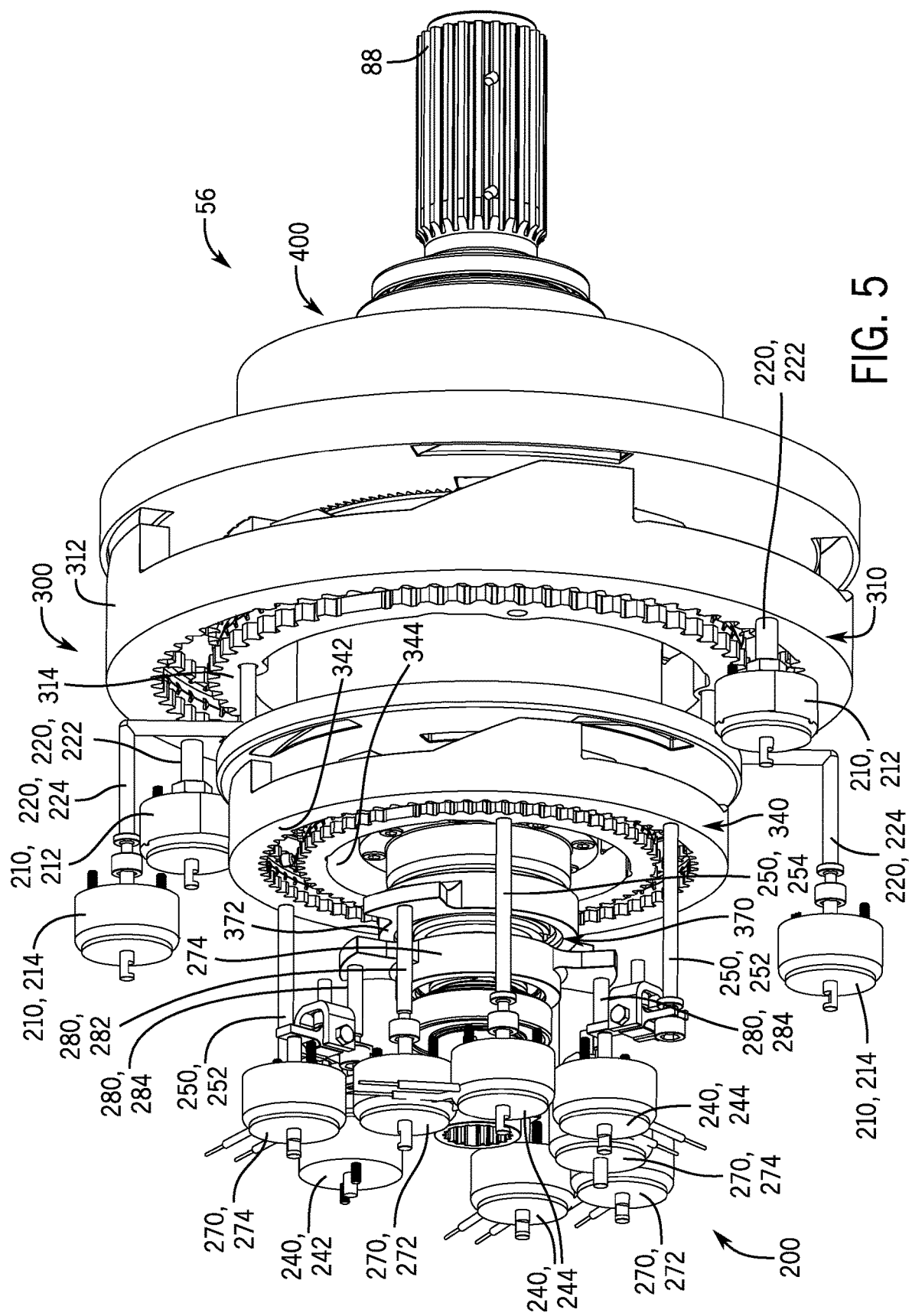
FIG. 5 is a side view of the drive assembly of FIGS. 3 and 4 in which housing elements are omitted.
Figure 6:
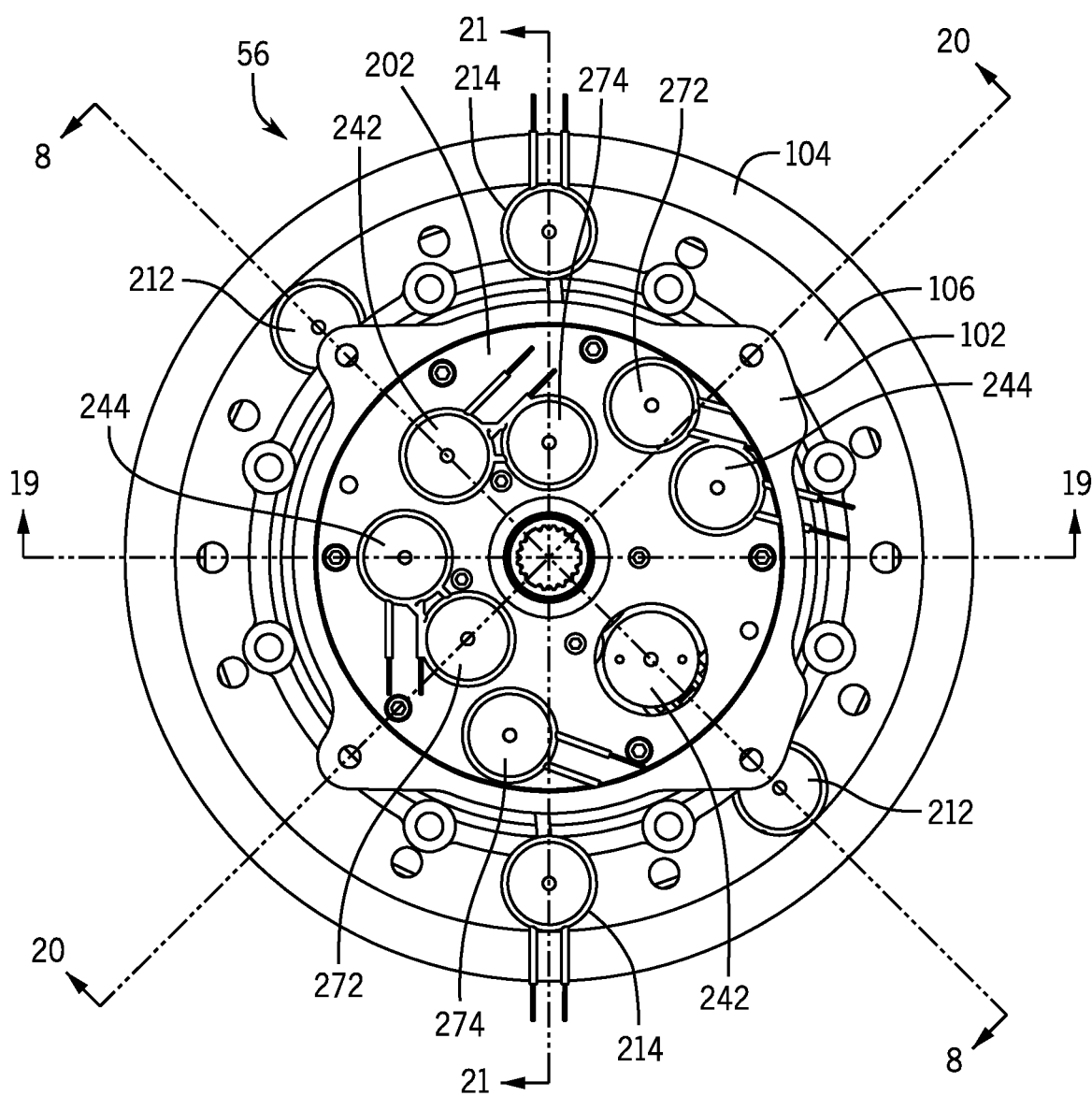
FIG. 6 is an end view of the drive assembly of FIGS. 3 and 4.

With reference to FIGS. 4-6, the drive assembly 56 is provided with an actuation assembly 200 configured to modify the power flow through the drive assembly 56 by repositioning one or more clutch arrangements within the housing arrangement 100 to selectively interact with a gear set.

For example, the view of FIG. 5 depicts the drive assembly 56 with one or more of the housing elements 102, 104 removed to show the actuation assembly 200, the clutch arrangement 300 and the gear set 400. The actuation assembly 200 includes at least one first actuator 210 and at least one second actuator 240. The at least one first actuator 210 may be supported on the first hub 106 (omitted from FIG. 5) and the at least one second actuator 240 may be supported on an actuator frame 202 (see, e.g., FIG. 4). The actuator frame 202 is fixed to the housing arrangement 100. For example, the actuator frame 202 may be fixed to the first housing element 102 and may also be considered a stationary reaction member.

The clutch arrangement 300 generally includes one or more clutch arrangements, such as a first clutch arrangement 310 and a second clutch arrangement 340. The at least one first actuator 210 is coupled to the first clutch arrangement 310 via at least one first linkage 220. Similarly, the at least one second actuator 240 is coupled to the second clutch arrangement 340 via at least one second linkage 250.

In one example, the at least one first actuator 210 is at least one low actuator, the first clutch arrangement 310 is a low clutch arrangement, and the at least one first linkage 220 is at least one low linkage. In one example, the at least one low actuator 210 includes a first low actuator 212 and a second low actuator 214 and the at least one low linkage 220 includes a first low linkage 222 and a second low linkage 224. The first low linkage 222 is interconnected between the first low actuator 212 and the low clutch arrangement 310, and the second low linkage 224 is interconnected between the second low actuator 214 and the low clutch arrangement 310. The first low actuator 212 and corresponding linkage 222, as well as the second low actuator 214 and corresponding linkage 224, may each be provided in pairs.

The low clutch arrangement 310 includes a first low clutch ring 312 and a second low clutch ring 314. The first low linkage 222 is interconnected between the first low actuator 212 and the first low clutch ring 312 such that the first low actuator 212 may transmit an actuation force to the first low clutch ring 312 via the first low linkage 222 to effect movement of the first low clutch ring 312 in at least one direction (e.g., a first axial direction 94 and/or a second axial direction 96). Similarly, the second low linkage 224 is interconnected between the second low actuator 214 and the second low clutch ring 314 such that the second low actuator 214 may transmit an actuation force to the second low clutch ring 314 via the second low linkage 224 to effect movement of the second low clutch ring 314 in at least one direction (e.g., the first axial direction 94 and/or the second axial direction 96).

In one example, the at least one second actuator 240 is at least one mid actuator, the second clutch arrangement 340 is a mid clutch arrangement, and the at least one second linkage 250 is at least one mid linkage. In one example, the at least one mid actuator 240 includes a first mid actuator 242 and a second mid actuator 244 and the at least one mid linkage 250 includes a first mid linkage 252 and a second mid linkage 254. The first mid linkage 252 is interconnected between the first mid actuator 242 and the mid clutch arrangement 340 and the second mid linkage 254 is interconnected between the second mid actuator 244 and the mid clutch arrangement 340. The first mid actuator 242 and corresponding linkage 252, as well as the second mid actuator 244 and corresponding linkage 254, may each be provided in pairs.

The mid clutch arrangement 340 includes a first mid clutch ring 342 and a second mid clutch ring 344. The first mid linkage 252 is interconnected between the first mid actuator 242 and the first mid clutch ring 342 such that the first mid actuator 242 may transmit an actuation force to the first mid clutch ring 342 via the first mid linkage 252 to effect movement of the first mid clutch ring 342 in at least one direction (e.g., the first axial direction 94 and/or the second axial direction 96). Similarly, the second mid linkage 254 is interconnected between the second mid actuator 244 and the second mid clutch ring 344 such that the second mid actuator 244 may transmit an actuation force to the second mid clutch ring 344 via the second mid linkage 254 to effect movement of the second mid clutch ring 344 in at least one direction (e.g., the first axial direction 94 and/or the second axial direction 96).

Each linkage 222, 224, 252, 254 is formed by an axial linkage portion (pin) and optionally, a radial linkage portion (or arm). For example, the axial linkage portion may be coupled directly to a corresponding actuator and a corresponding clutch ring. In such an example, the actuator is operated to effect axial movement of the axial linkage portion to effect movement of the corresponding clutch ring along the drive axis 92. In other examples, the radial linkage portion may be coupled to the actuator and the axial linkage portion may be coupled to the radial linkage portion and a corresponding clutch ring. In such an example, the actuator is operated to effect pivoting movement of the radial linkage portion which, in turn, effects axial movement of the axial linkage portion to effect movement of the corresponding clutch ring along the drive axis 92.

Generally, the actuators 212, 214, 242, 244 are electromechanical solenoid devices that generate linear movement at a respective armature by manipulating an induced magnetic field within the solenoid devices, and turn, generate an actuation force. In one example, as the solenoid devices are activated or engaged, the armatures move out of the solenoid devices, although an activated or engaged solenoid devices may also move armatures into the solenoid devices. Further, in this example, the actuators 212, 214, 242, 244 may be oriented in different directions such that a single type of solenoid device (e.g., a push solenoid device or a pull solenoid device) may be used in different positions to produce the desired movements within the drive assembly 56. As used herein, the term "active" or "engaged" actuator refers to movement of the actuator that results in the engaged position of the respective clutch portion (e.g., regardless of whether the respective actuator is pushing, pulling, and/or enabling a spring or other force to engage the clutch element). Although not shown, the actuators 212, 214, 242, 244 include at least one connection element that enables wired or wireless commands and/or power with respect to the control system 30 (FIG. 2A) and/or other sources. Other types and arrangements of actuators and linkages may be provided.

With further reference to FIGS. 5 and 6, the actuation assembly 200 may further include at least one third actuator 270. The at least one third actuator 270 may be supported on the actuator frame 202. In addition, the clutch arrangement 300 may further include a third clutch arrangement 370. The at least one third actuator 270 is coupled to the third clutch arrangement 370 by at least one third linkage 280. Similar to the at least one first and second actuators 210, 240, the at least one third actuator 270 may also be an electromechanical solenoid device that generates linear movement at a respective armature by manipulating an induced magnetic field within the solenoid devices, and in turn, generates an actuation force.

In one example, the at least one third actuator 270 is a high actuator, the third clutch arrangement 370 is a high clutch arrangement, and the at least one third linkage 280 is a high actuator linkage. In one example, the at least one high actuator 270 includes a first high actuator 272 and a second high actuator 274 and the at least one high linkage 280 includes a first high linkage 282 and a second high linkage 284. The first high linkage 282 is interconnected between the first high actuator 272 and the high clutch arrangement 370, and the second high linkage 284 is interconnected between the second high actuator 274 and the high clutch arrangement 370. The first high actuator 272 and corresponding linkage 282, as well as the second high actuator 274 and corresponding linkage 284, may each be provided in pairs.

The high clutch arrangement 370 includes a first high clutch ring 372 and a second high clutch ring 374. The first high linkage 282 is interconnected between the first high actuator 272 and the first high clutch ring 372 such that the first high actuator 272 may transmit an actuation force to the first high clutch ring 372 via the first high linkage 282 to effect movement of the first high clutch ring 372 in at least one direction (e.g., the first axial direction 94 and/or the second axial direction 96). Similarly, the second high linkage 284 is interconnected between the second high actuator 274 and the second high clutch ring 374 such that the second high actuator 274 may transmit an actuation force to the second high clutch ring 374 via the second high linkage 284 to effect movement of the second high clutch ring 374 in at least one direction (e.g., the first axial direction 94 and/or the second axial direction 96).

The high linkages 282, 284 may be formed and operate in the same manner as the low and mid linkages 222, 224, 252, 254 described above. For example, the high linkages 282, 284 may be formed by an axial linkage portion (pin) and optionally, a radial linkage portion (arm). In one example, one or more of the high actuators 272, 274 may be operated to effect axial movement of the axial linkage portion to effect movement of the corresponding high clutch ring 372, 374 along the drive axis 92. In other examples, one or more of the high actuators 272, 274 may be operated to effect pivoting movement of the radial linkage portion which, in turn, effects axial movement of the axial linkage portion to effect movement of the corresponding high clutch ring 372, 374 along the drive axis 92.

Figure 7:
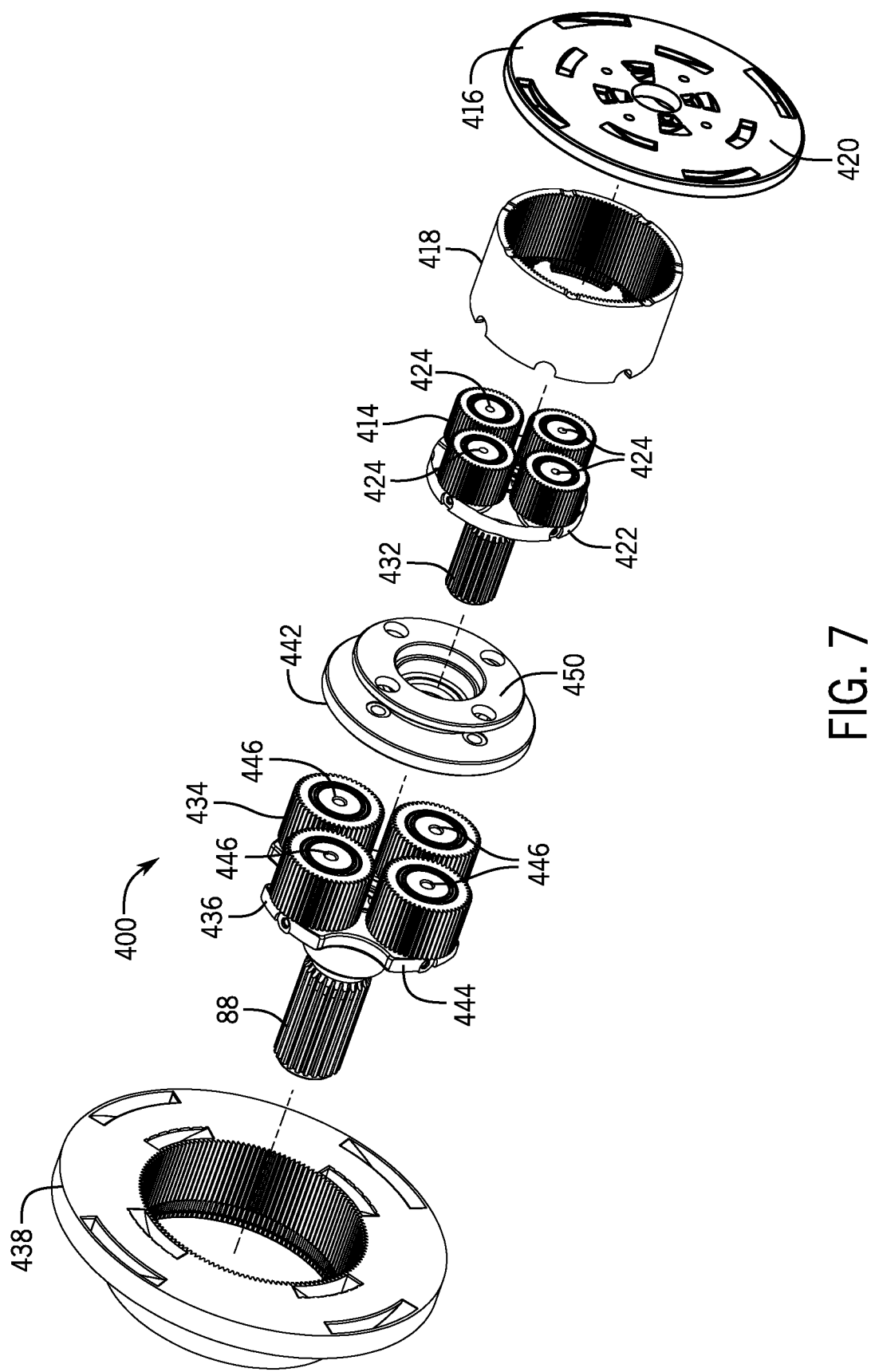
FIG. 7 is an exploded view of a gear set of the drive assembly of FIGS. 3 and 4.
Figure 8:
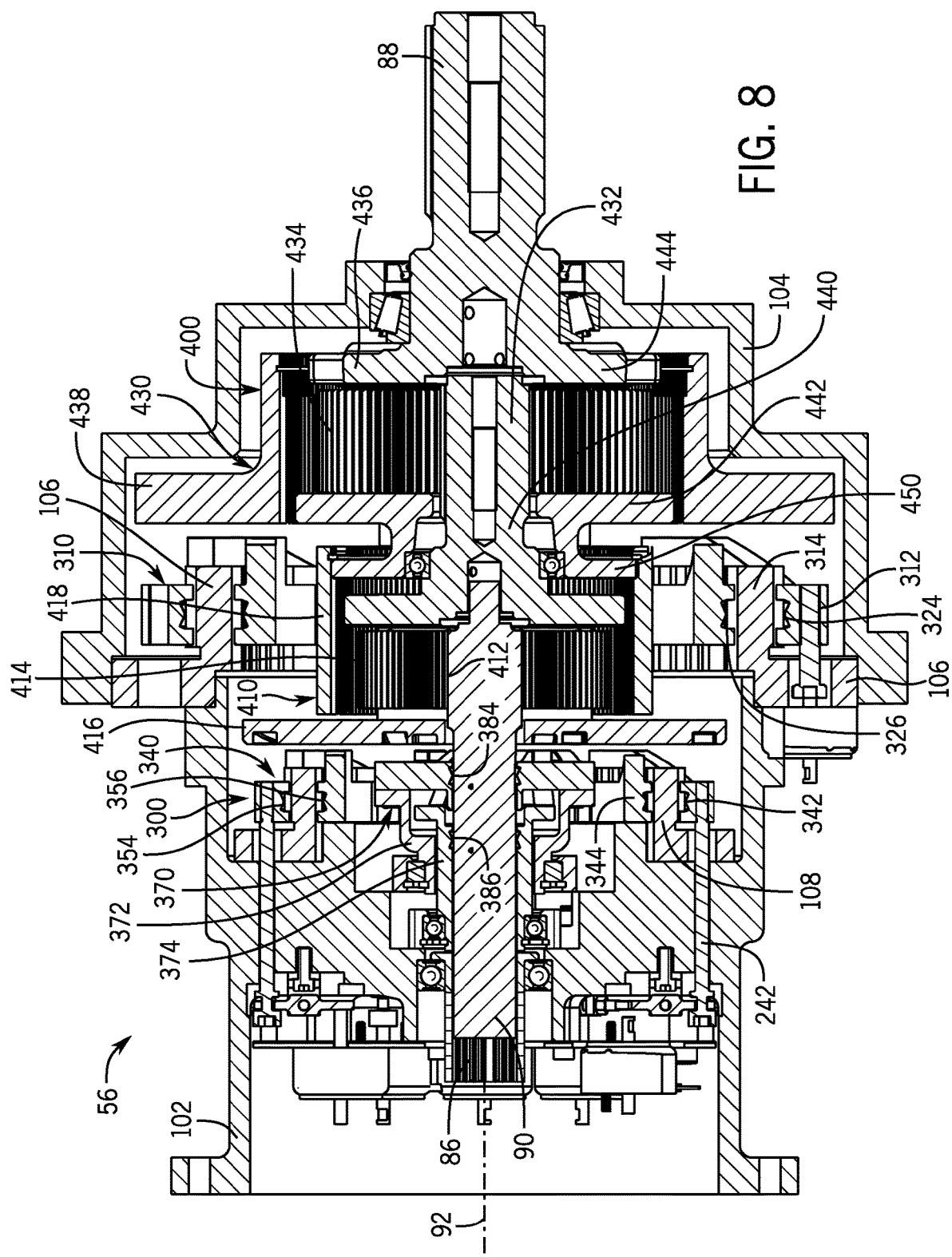
FIG. 8 is a cross-sectional view of the drive assembly of FIGS. 3 and 4 through line 8-8 of FIG. 6.

Referring now to exploded view of FIG. 7 and the cross-sectional view of FIG. 8, the drive assembly 56 further includes a gear set 400 position relative to the clutch arrangement 300. The clutch arrangement 300 is configured to selectively interact with one or more portions of the gear set 400 to modify the power flow through the drive assembly 56. In this manner, the transfer of torque between the input element 86 and output element 88 at predetermined gear ratios may be selectively provided based on the status of the clutch arrangements 310, 340, 370.

The drive shaft 90 extends through at least a portion of the interior of the housing arrangement 100 and the gear set 400. The input element 86 of the drive assembly 56 is integral with or otherwise coupled to the drive shaft 90, which in turn is coupled to drive the gear set 400. The drive assembly 56 includes one or more bearing elements configured to support rotation of the rotatable elements relative to the stationary elements, as well as rotation of rotatable elements relative other rotatable elements (e.g., if a rotatable element is grounded or rotating at different speed).

In one example, the gear set 400 is a planetary gear set having a first stage 410 and a second stage 430. The planetary gear set 400 includes a first-stage sun gear 412, first-stage planet gears 414, a first-stage carrier 416 and a first-stage ring gear 418. The first-stage sun gear 412 is configured for rotation with the drive shaft 90 and includes outer teeth or splines to mesh with the first-stage planet gears 414. In one example, the first-stage sun gear 412 is formed integrally as a one piece with the drive shaft 90. In such an example, the first-stage sun gear 412 may optionally be provided as a section of increased diameter along the drive shaft 90. In other examples, the first-stage sun gear 412 may be formed separately from the drive shaft 90 and mounted on the drive shaft 90. The first-stage sun gear 412 is rotationally fixed to the drive shaft 90 to rotate with the drive shaft 90. For example, the first-stage sun gear 412 may be rotationally fixed to the drive shaft 90 by a splined engagement between an inner surface of the first-stage sun gear 412 and an outer surface of the drive shaft 90.

The first-stage planet gears 414 circumscribe the first-stage sun gear 412, and in one example, are arranged in a single circumferential row. However, in other examples, the first-stage planet gears 414 may be arranged in radially stacked circumferential rows, with an odd number of planet gears in the radial direction (i.e., an odd number of rows). Each of the first-stage planet gears 414 includes teeth or splines for meshing with the first-stage sun gear 412 to accommodate transmission of forces between the first-stage planet gears 414 and the first-stage sun gear 412.

The first-stage carrier 416 circumscribes the drive shaft 90 and is configured for selective rotation on the drive axis 92. The first-stage carrier 416 is at least partially formed by first and second radially extending, axially facing first-stage carrier plates 420, 422. The first-stage carrier plates 420, 422 include a row of mounting locations for receiving first planet axles 424 extending through and supporting corresponding first-stage planet gears 414. In one example, the first and second first-stage carrier plates 420, 422 are axially spaced from one another and the first-stage planet gears 414 are arranged at least partially between the first first-stage carrier plate 420 and the second first-stage carrier plate 422. In addition, the first planet axles 424 may rotationally fix the first and second first-stage carrier plates 420, 422 to one another, such that the carrier plates 420, 422 are configured to rotate together and/or be held against rotation together. Thus, collective movements or movement restrictions of the first-stage carrier plates 420, 422 corresponds to movements or movement restrictions of the first-stage carrier 416.

In an example arrangement of the first-stage carrier 416 and the first-stage planet gears 414, each first planet axle 424 forms an individual axis of rotation for a corresponding first-stage planet gear 414 which enables the first-stage planet gear 414 to rotate, or spin, relative to the first-stage carrier 416 on the axis of the first planet axle 424. Such an arrangement also enables the first-stage planet gears 414 to collectively rotate about the drive axis 92 with the first-stage carrier 416. In addition, the first planet axles 424 enable transmission of forces between the first-stage planet gears 414 and the first-stage carrier 416.

The first-stage ring gear 418 circumscribes the first-stage planet gears 414 and the drive axis 92. The first-stage ring gear 418 includes teeth arranged on a radially inner surface which mesh with the teeth of the first-stage planet gears 414 to accommodate transmission of forces between the first-stage planet gears 414 and the first-stage ring gear 418.

In operation, forces may be transmitted between the drive shaft 90 and the first-stage sun gear 412, for example, by way of the one-piece construction or a splined engagement between the drive shaft 90 and the first-stage sun gear 412. In addition, forces may be transmitted between the first-stage sun gear 412 and the first-stage planet gears 414 by way of the meshed engagement of corresponding teeth on the first-stage sun gear 412 and the first-stage planet gears 414. Further, forces may be transmitted between the first-stage planet gears 414 the first-stage ring gear 418 by way of the meshed engagement of corresponding teeth on the first-stage planet gears 414 and the first-stage ring gear 418. Further still, forces may be transmitted between the first-stage planet gears 414 and the first-stage carrier 416 by way of the first planet axles 424.

The gear set 400 further includes a second-stage sun gear 432, second-stage planet gears 434, a second-stage carrier 436 and a second-stage ring gear 438. The second-stage sun gear 432 is configured for selective rotation on the drive axis 92 and includes outer teeth or splines to mesh with second-stage planet gears 434. In some examples, the second-stage sun gear 432 is formed integrally as one piece with a second-stage shaft 440 extending along the drive axis 92, and thus, is configured to rotate with the second-stage shaft 440. Alternatively, the second-stage sun gear 432 may be formed separately from second-stage shaft 440 and mounted on the second-stage shaft 440 to rotate with the second-stage shaft 440. For example, the second-stage sun gear 432 may be rotationally fixed to the second-stage shaft 440 by a splined engagement between the inner surface of the second-stage sun gear 432 and an outer surface of the second-stage shaft 440. In this arrangement, the second-stage shaft 440 and the second-stage sun gear 432 may rotate together with, or independently of, the drive shaft 90 depending on the status of the clutch arrangements 310, 340, 370.

The second-stage planet gears 434 circumscribe the second-stage sun gear 432, and in one example, are arranged in a single circumferential row. However, in other examples, the second-stage planet gears 434 may be arranged in radially stacked circumferential rows, with an odd number of planet gears in the radial direction (i.e., an odd number of rows). Each of the second-stage planet gears 434 includes teeth or splines for meshing with the second-stage sun gear 432 to accommodate transmission of forces between the second-stage planet gears 434 and the second-stage sun gear 432.

The second-stage carrier 436 circumscribes the second-stage shaft 440 and is configured for selective rotation on the drive axis 92. The second-stage carrier 436 is at least partially formed by first and second radially extending, axially facing second-stage carrier plates 442, 444. The second-stage carrier plates 442, 444 include a row of mounting locations for receiving second planet axles 446 extending through and supporting corresponding second-stage planet gears 434. In one example, the first and second second-stage carrier plates 442, 444 are axially spaced from one another and the second-stage planet gears 434 are arranged at least partially between the first second-stage carrier plate 442 and the second second-stage carrier plate 444. In addition, the second planet axles 446 may rotationally fix the first and second second-stage carrier plates 442, 444 to one another, such that the carrier plates 442, 444 are configured to rotate together and/or be held against rotation together. Thus, collective movements or movement restrictions of the second-stage carrier plates 442, 444 correspond to movements or movement restrictions of the second-stage carrier 436.

In an example arrangement of the second-stage carrier 436 and the second-stage planet gears 434, each second planet axle 446 forms an individual axis of rotation for a corresponding second-stage planet gear 434 which enables the second-stage planet gear 434 to rotate, or spin, relative to the second-stage carrier 436 on the axis of the second planet axle 446. Such an arrangement also enables the second-stage planet gears 434 to collectively rotate about the drive axis 92 with the second-stage carrier 436. In addition, the second planet axles 446 enable transmission of forces between the second-stage planet gears 434 and the second-stage carrier 436.

The second-stage ring gear 438 circumscribes the second-stage planet gears 434 and the drive axis 92. The second-stage ring gear 438 includes teeth arranged on a radially inner surface which mesh with the teeth of the second-stage planet gears 434 to accommodate transmission of forces between the second-stage planet gears 434 and the second-stage ring gear 438.

In operation, forces may be transmitted between the second-stage shaft 440 and the second-stage sun gear 432, for example, by way of the one-piece construction or a splined engagement between the second-stage shaft 440 and the second-stage sun gear 432. In addition, forces may be transmitted between the second-stage sun gear 432 and the second-stage planet gears 434 by way of the meshed engagement of corresponding teeth on the second-stage sun gear 432 and the second-stage planet gears 434. Further, forces may be transmitted between the second-stage planet gears 434 the second-stage ring gear 438 by way of the meshed engagement of corresponding teeth on the second-stage planet gears 434 and the second-stage ring gear 438. Further still, forces may be transmitted between the second-stage planet gears 434 and the second-stage carrier 436 by way of the second planet axles 446.

The second-stage carrier 436 is rotationally fixed to the first-stage ring gear 418 such that the second-stage carrier 436 and the first-stage ring gear 418 rotate together. In one example, a carrier adapter 450 is interconnected between the first-stage ring gear 418 and the second-stage carrier 436 to rotatably fix the first-stage ring gear 418 to the second-stage carrier 436. The carrier adapter 450 may be connected to the first second-stage carrier plate 442. Thus, the first-stage ring gear 418, the carrier adapter 450, and the second-stage carrier 436 may selectively rotate or be held against rotation, as a unit.

Additionally, the first-stage carrier 416 is rotationally fixed to the second-stage sun gear 432 such that the first-stage carrier 416 and the second-stage sun gear 432 may selectively rotate together or be held against rotation together. In one example, the second first-stage carrier plate 422 is formed integrally as one piece with, or rotationally fixed to, the second-stage shaft 440, which is rotationally fixed to the second-stage sun gear 432. Thus, the first-stage carrier 416, the second-stage shaft 440 and the second-stage sun gear 432 may rotate, or be held against rotation, as a unit.

The second-stage carrier 436 outputs rotational speed and torque from the gear set 400. In one example, the second second-stage carrier plate 444 is formed integrally as one piece with, or is rotationally fixed to, the output element 88. For example, the second second-stage carrier plate 444 may include an axial hub extending on the drive axis 92 and projecting outwardly from the housing arrangement 100 which functions as the output element 88.

Figure 9:
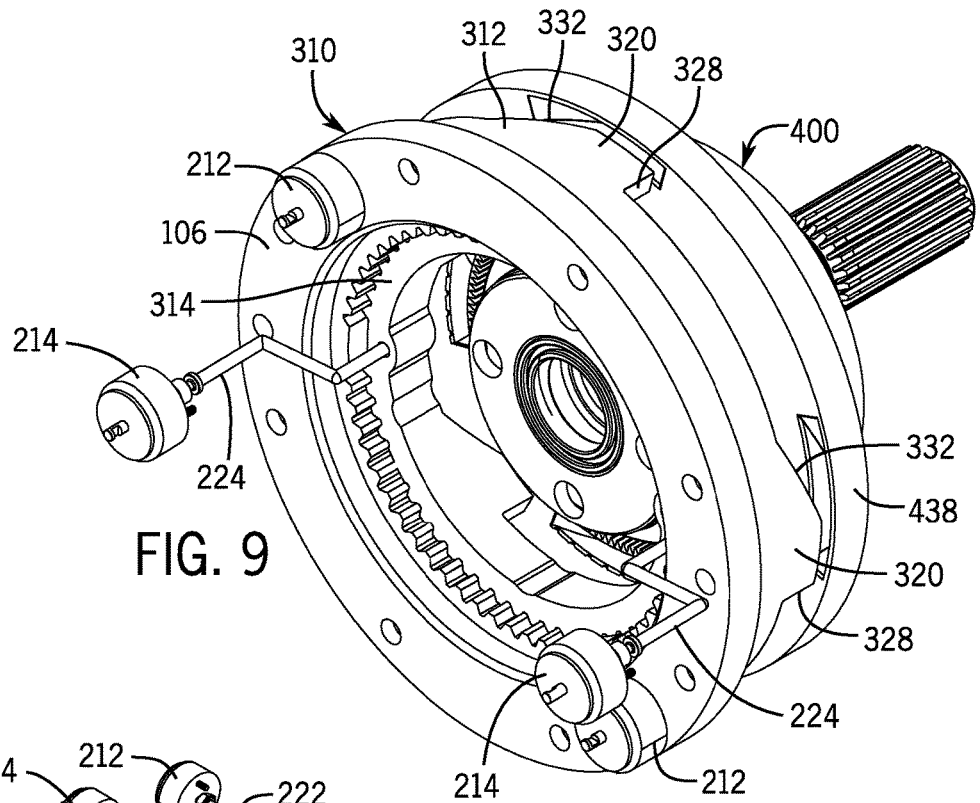
FIG. 9 is an isometric view of a first clutch arrangement and a portion of a gear set of the drive assembly of FIGS. 3 and 4.
Figure 10:
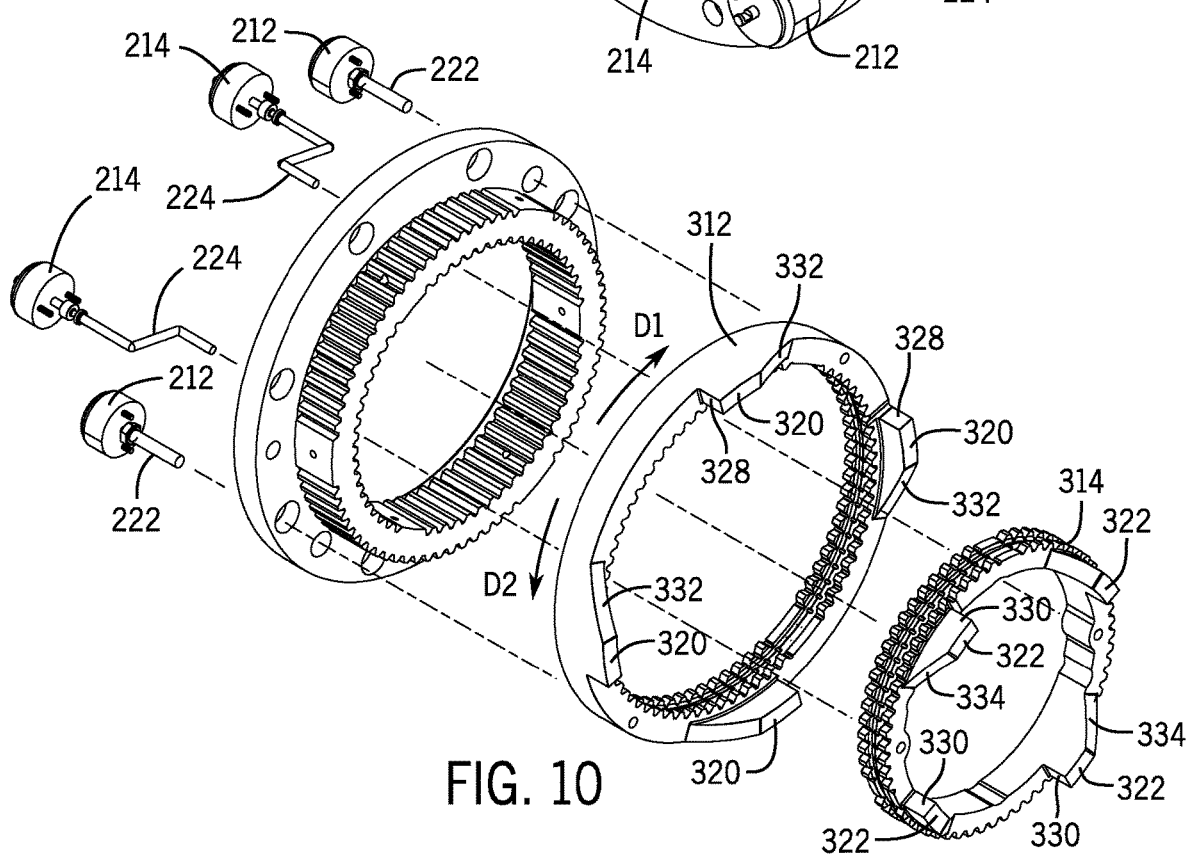
FIG. 10 is a partial exploded isometric view of the first clutch arrangement of the drive assembly of FIGS. 3 and 4.
Figure 11:
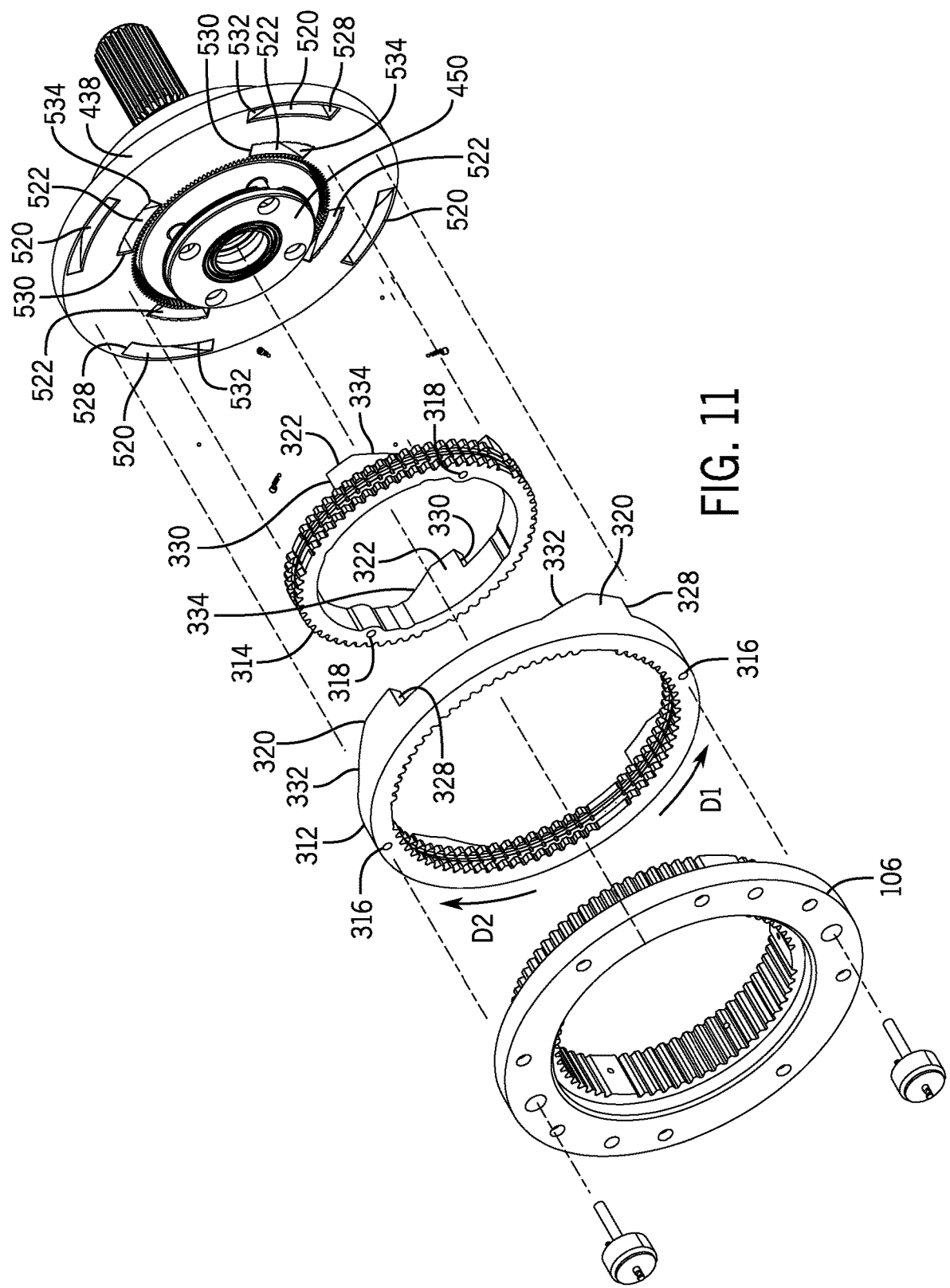
FIG. 11 is an exploded isometric view of the first clutch arrangement and a portion of a gear set of the drive assembly of FIGS. 3 and 4.

With continued reference to FIG. 8, and additional reference to FIGS. 9-11, the low clutch arrangement 310 is shown positioned relative to a portion of the gear set 400. In one example, the low clutch arrangement 310 includes a first low clutch ring 312 and a second low clutch ring 314. The first and second low clutch rings 312, 314 are generally ring-shaped and positioned for axial movement along the first hub 106. In one example, the first low clutch ring 312 circumscribes the first hub 106 and is grounded by the first hub 106, for example, by a splined engagement. The second low clutch ring 314 is circumscribed by the first hub 106 and is grounded the first hub 106, for example, by a splined engagement.

The first and second low clutch rings 312, 314 are generally positioned proximate to the second-stage ring gear 438. The first and second low clutch rings 312, 314 include a mounting structure or tabs 316, 318 such that the first low clutch ring 312 is coupled to the first low linkage 222 and the second low clutch ring 314 is coupled to the second low linkage 224 for actuation by corresponding low actuators 212, 214. In effect, the first and second low clutch rings 312, 314 may be considered a bifurcated clutch arrangement.

The first low clutch ring 312 includes one or more first low clutch engagement elements 320 configured for selective engagement with, and disengagement from, the second-stage ring gear 438. In one example, the first low clutch engagement elements 320 may selectively engage and disengage corresponding first low gear engagement elements 520 on the second-stage ring gear 438.

The second low clutch ring 314 includes one or more second low clutch engagement elements 322 configured for selective engagement with, and disengagement from, the second-stage ring gear 438. In one example, the second low clutch engagement elements 322 may selectively engage and disengage corresponding second low gear engagement elements 522 of the second-stage ring gear 438.

Accordingly, the low clutch arrangement 310 may be selectively repositioned by the low actuators 212, 214 via the low linkages 222, 224 into various positions relative to the second-stage ring gear 438. In one example, the first low clutch ring 312 is configured such that the first low actuator 212 functions to reposition the first low clutch ring 312 via the first low linkage 222 towards the second-stage ring gear 438 to an engaged position in which the first low clutch engagement elements 320 are engaged with the corresponding first low gear engagement elements 520. Conversely, the first low clutch ring 312 may be repositioned away from the second-stage ring gear 438 to a disengaged position in which the first low clutch engagement elements 320 are disengaged from the corresponding first low gear engagement elements 520.

Similarly, second low clutch ring 314 is configured such that the second low actuator 214 functions to reposition the second low clutch ring 314 via the second low linkage 224 towards the second-stage ring gear 438 to an engaged position in which the second low clutch engagement elements 322 are engaged with the corresponding second low gear engagement elements 522. Conversely, the second low clutch ring 314 may be repositioned away from the second-stage ring gear 438 to a disengaged position in which the second low clutch engagement elements 322 are disengaged from the corresponding second low gear engagement elements 522.

The first and second low clutch rings 312, 314 are moved axially when repositioning from the disengaged position to the engaged position and from the engaged position to the disengaged position. In one example, the first and second low clutch rings 312, 314 are moved in the first axial direction 94 to respective engaged positions and in the second axial direction 96 to respective disengaged positions. The first and second clutch rings 312, 314 may be repositioned away from the second-stage ring gear 438 and moved to respective disengaged positions, for example, under a biasing force from respective biasing elements and/or by operation of corresponding low actuators 212, 214. In some examples, the first and second low actuators 212, 214 may remain activated to maintain the first and second low clutch rings 312, 314 in respective engaged positions. The low actuators 212, 214 may be deactivated to allow respective biasing elements (not shown) to reposition the low clutch rings 312, 314 away from the second-stage ring gear 438.

In some examples, the first and second low clutch rings 312, 314 may be retained at one or more axial positions relative to the gear set 400 by corresponding first and second low retention mechanisms 324, 326. For example, the low clutch rings 312, 314 may be retained in respective engaged positions relative to the second-stage ring gear 438 by the corresponding retention mechanisms 324, 326. In one example, the retention mechanisms 324, 326 may be formed as spring-loaded ball and detent mechanisms. An axial force applied to the low clutch rings 312, 314 exceeding a predetermined threshold value causes the low retention mechanisms 324, 326 to release the corresponding low clutch rings 312, 314 for repositioning relative to the gear set 400.

The one or more first low clutch engagement elements 320 and the one or more second low clutch engagement elements 322 may be provided as cavities, protrusions, teeth, or dogs, or combinations thereof, configured for circumferential engagement that are oriented towards the second-stage ring gear 438. The one or more first low gear engagement elements 520 and the one or more second low gear engagement elements 522 are arranged on an axial face of the second-stage ring gear 438 and are oriented in a direction to selectively interact with corresponding first and second low clutch engagement elements 320, 322.

The first and second low clutch engagement elements 320, 322 are each formed with a squared or perpendicular side 328, 330 facing generally in a clock (rotational) direction and a ramped side 332, 334 angled relative to the squared sides 328, 330. The first and second low gear engagement elements 520, 522 are each formed with a squared or perpendicular side 528, 530 facing generally in a clock direction opposing the squared side 328, 330 of the corresponding first and second low clutch ring engagement element 320, 322. The first and second low gear engagement elements 520, 522 are each formed with a ramped side 532, 534 facing generally in a direction opposing the ramped side 332, 334 of the corresponding first and second low clutch engagement element 320, 322.

In one example, the squared sides 328 of the first low clutch engagement elements 320 generally face in the second clock direction D2 and the squared sides 528 of the first low gear engagement elements 520 generally face in the first clock direction D1. The ramped sides 332 of the first low clutch engagement elements 320 face partially in the first clock direction D1 and the ramped sides 532 of the first low gear engagement elements 520 face partially in the second clock direction D2.

In the engaged position of the first low clutch ring 312, the squared sides 328, 528 of corresponding first low clutch engagement elements 320 and first low gear engagement elements 520 are disposed in opposing relationship with each other and are configured to interact with one another, for example, in response to application of a force to the second-stage ring gear 438 for effecting rotation of the second-stage ring gear 438 on the drive axis 92 in the first clock direction D1. In addition, the ramped sides 332, 532 of corresponding first low clutch engagement elements 320 and first low gear engagement elements 520 are disposed in opposing relationship with each other and are configured to interact with one another, for example, in response to rotation of the second-stage ring gear 438 relative to the first low clutch ring 312 in the second clock direction D2.

The first low clutch ring 312 is grounded to the first hub 106. Thus, in the engaged position of the first low clutch ring 312, the second-stage ring gear 438 is grounded, i.e., held against rotation, in the first clock direction D1 by way of the interaction between the squared sides 328, 528 of the corresponding engagement elements 320, 520. Moreover, the second-stage ring gear 438 may "overrun" or "slip" (e.g., slide along the ramps) relative to the first low clutch ring 312 in the second clock direction D2 by way of the interaction between the ramped sides 332, 532 of the corresponding engagement elements 320, 520. In this example, interaction between the ramped sides 332, 532 causes an axial force to be applied to the first low clutch ring 312. If the axial force is sufficient to overcome a retaining force of the first low retention mechanism 324, the first low clutch ring 312 moves axially away from the second-stage ring gear 438. In one example, the first low clutch engagement elements 320 are moved out of engagement from the first low gear engagement elements 520 such that the first low clutch ring 312 may be considered disengaged from the gear set 400.

Further, in this example, the squared sides 330 of the second low clutch engagement elements 322 generally face in the first clock direction D1 and the squared sides 530 of the second low gear engagement elements 522 generally face in the second clock direction D2. The ramped sides 334 of the second low clutch engagement elements 322 face partially in the second clock direction D2 and the ramped sides 534 of the second low gear engagement elements 522 face partially in the first clock direction D1.

In the engaged position of the second low clutch ring 314, the squared sides 330, 530 of corresponding second low clutch engagement elements 322 and second low gear engagement elements 522 are disposed in opposing relationship and configured to interact with one another, for example, in response to application of a force to the second-stage ring gear 438 for effecting rotation of the second-stage ring gear 438 on the drive axis 92 in the second clock direction D2. In addition, the ramped sides 334, 534 of corresponding second low clutch engagement elements 322 and second low gear engagement elements 522 are disposed in opposing relationship and are configured to interact with one another, for example, in response to rotation of the second-stage ring gear 438 relative to the second low clutch ring 314 in the first clock direction D1.

The second low clutch ring 314 is grounded to the first hub 106. Thus, in the engaged position of the second low clutch ring 314, the second-stage ring gear 438 is grounded, i.e., held against rotation, in the second clock direction D2 by way of interaction between the squared sides 330, 530 of the corresponding engagement elements 322, 522. Moreover, the second-stage ring gear 438 may "overrun" or "slip" (e.g., slide along the ramps) relative to the second low clutch ring 314 in the first clock direction D1 by way of interaction between the ramped sides 334, 534 of the corresponding engagement elements 322, 522. In this example, interaction between ramped sides 334, 534 of the corresponding engagement elements 322, 522 causes an axial force to be applied to the second low clutch ring 314. If axial force is sufficient to overcome a retaining force of the second low retention mechanism 326, the second low clutch ring 314 moves axially away from the second-stage ring gear 438. In one example, the second low clutch engagement elements 322 are moved out of engagement from the second low gear engagement elements 522 such that the second low clutch ring 314 may be considered disengaged from the gear set 400.

The first and second low clutch rings 312, 314 may be repositioned by corresponding low actuators 212, 214 individually and independently of one another. Accordingly, the first and second low clutch rings 312, 314 may be considered to have a first collective position in which the first and second low clutch rings 312, 314 are disengaged from the gear set 400, a second collective position in which the first low clutch ring 312 is engaged with the gear set 400 and the second low clutch ring 314 is disengaged from the gear set 400, a third collective position in which the first low clutch ring 312 is disengaged from the gear set 400 and the second low clutch ring 314 is engaged with the gear set 400, and a fourth collective position in which the first and second low clutch rings 312, 314 are engaged with the gear set 400.

In the first collective position, the second-stage ring gear 438 may rotate relative to the low clutch rings 312, 314 in the first and second clock directions D1, D2. In the second collective position, the low clutch arrangement 310 may be considered unidirectionally engaged to ground the second-stage ring gear 438 in the first clock direction D1 and not in the second clock direction D2. In the third collective position, the low clutch arrangement 310 may be considered unidirectionally engaged to ground the second-stage ring gear 438 in the second clock direction D2 and not in the first clock direction D1. In the fourth collective position, the low clutch arrangement 310 may be considered bi-directionally engaged to ground the second-stage ring gear 438 in the first and second clock directions D1, D2.

Figure 12:
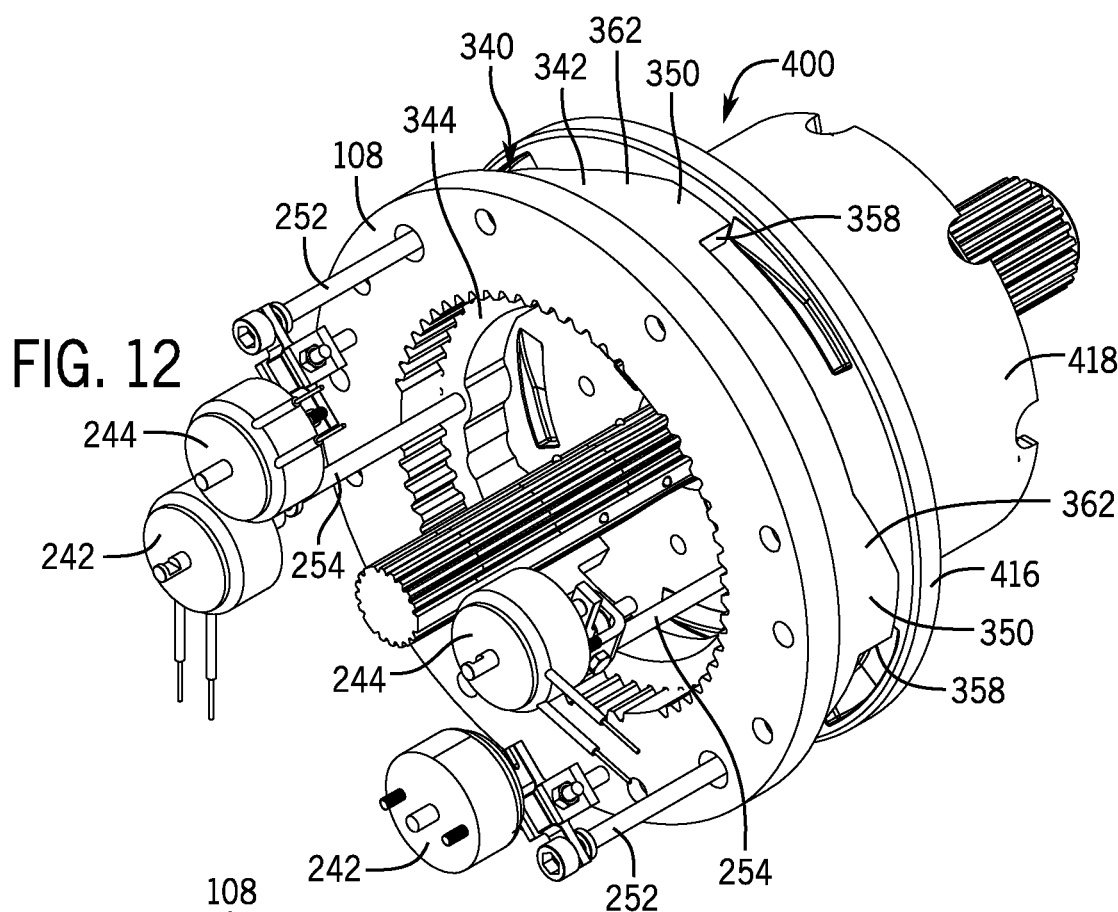
FIG. 12 is an isometric view of a second clutch arrangement and a portion of a gear set of the drive assembly of FIGS. 3 and 4.
Figure 13:
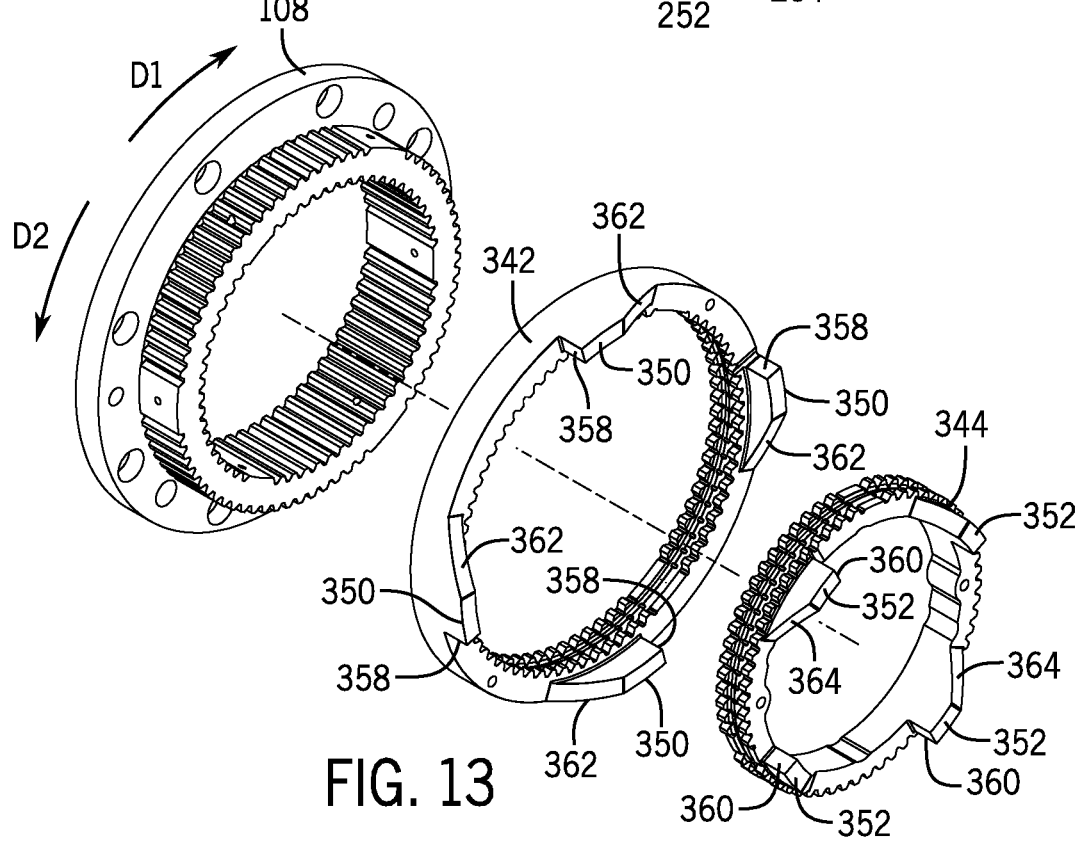
FIG. 13 is a partial exploded isometric view of the second clutch arrangement of the drive assembly of FIGS. 3 and 4.
Figure 14:
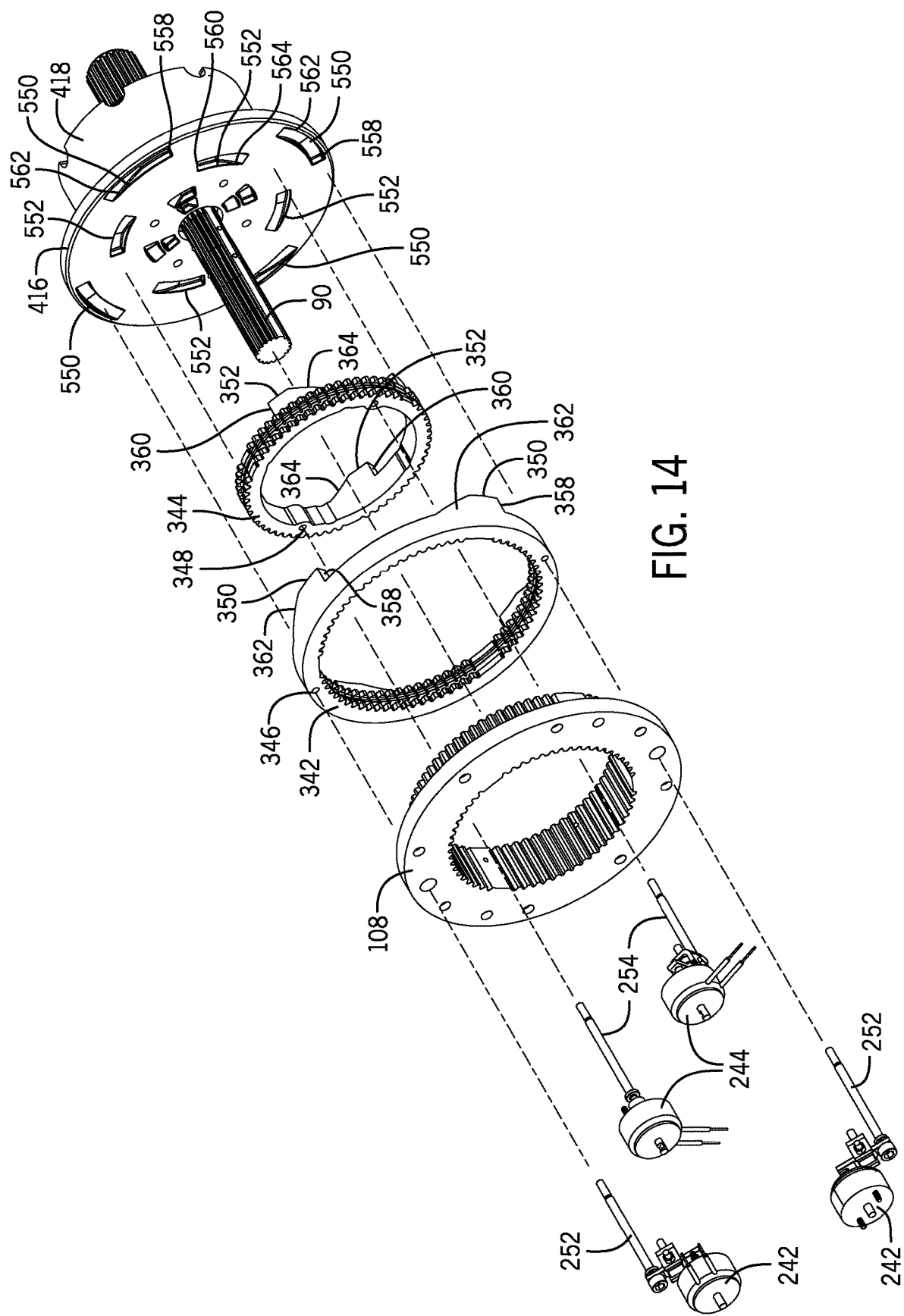
FIG. 14 is an exploded isometric view of the second clutch arrangement and a portion of a gear set of the drive assembly of FIGS. 3 and 4.

With continued reference to FIG. 8, and additional reference to FIGS. 12-14, the mid clutch arrangement 340 is shown positioned relative to another portion of the gear set 400. In one example, the mid clutch arrangement 340 includes first mid clutch ring 342 and a second mid clutch ring 344. The first and second mid clutch rings 342, 344 are generally ring-shaped and positioned for axial movement along the second hub 108 toward and away from the gear set 400. In one example, the first mid clutch ring 342 circumscribes the second hub 108 and is grounded by the second hub 108, for example, by a splined engagement. The second mid clutch ring 344 is circumscribed by the second hub 108 and is grounded by the second hub 108, for example, by a splined engagement.

The first and second mid clutch rings 342, 344 are generally positioned proximate to the first-stage carrier 416. The first and second mid clutch rings 342, 344 include a mounting structure or tabs 346, 348 such that the first mid clutch ring 342 is coupled to the first mid linkage 252 and the second mid clutch ring 344 is coupled to the second mid linkage 254 for actuation by corresponding mid actuators 242, 244. In effect, the first and second mid clutch rings 342, 344 may be considered a bifurcated clutch arrangement.

The first mid clutch ring 342 includes one or more first mid clutch engagement elements 350 configured for selective engagement with, and disengagement from, the first-stage carrier 416. In one example, the first mid clutch engagement elements 350 may selectively engage and disengage corresponding first mid gear engagement elements 550 on the first-stage carrier 416.

The second mid clutch ring 344 includes one or more second mid clutch engagement elements 352 configured for selective engagement with, and disengagement from, the first-stage carrier 416. In one example, the second mid clutch engagement elements 352 may selectively engage and disengage corresponding second mid gear engagement elements 552 of the first-stage carrier 416.

Accordingly, the mid clutch arrangement 340 may be selectively repositioned by the mid actuators 242, 244 via the mid linkages 252, 254 into various positions relative to the first-stage carrier 416. In one example, the first mid clutch ring 342 is configured such that the first mid actuator 242 functions to reposition the first mid clutch ring 342 via the first mid linkage 252 towards the first-stage carrier 416 to an engaged position in which the first mid clutch engagement elements 350 are engaged with the corresponding first mid gear engagement elements 550. Conversely, the first mid clutch ring 342 may be repositioned away from the first-stage carrier 416 to a disengaged position in which the first mid clutch engagement elements 350 are disengaged from the corresponding first mid gear engagement elements 550.

Similarly, the second mid clutch ring 344 is configured such that the second mid actuator 244 functions to reposition the second mid clutch ring 344 via the second mid linkage 254 towards the first-stage carrier 416 to an engaged position in which the second mid clutch engagement elements 352 are engaged with the corresponding second mid gear engagement elements 552. Conversely, the second mid clutch ring 344 may be repositioned away from the first-stage carrier 416 to a disengaged position in which the second mid clutch engagement elements 352 are disengaged from the corresponding second mid gear engagement elements 552.

The first and second mid clutch rings 342, 344 are moved axially when repositioning from the disengaged position to the engaged position and from the engaged position to the disengaged position. In one example, the first and second mid clutch rings 342, 344 are moved in the first axial direction 94 to respective engaged positions and in the second axial direction 96 to respective disengaged positions. The first and second mid clutch rings 342, 344 may be repositioned away from the first-stage carrier 416 and moved to respective disengaged positions, for example, under a biasing force from respective biasing elements and/or by operation of corresponding mid actuators 242, 244. In some examples, the first and second mid actuators 242, 244 may remain activated to maintain the first and second mid clutch rings 342, 344 in respective engaged positions. The mid actuators 342, 344 may be deactivated to allow respective biasing elements (not shown) to reposition the mid clutch rings 342, 344 away from the first-stage carrier 416.

In some examples, the first and second mid clutch rings 342, 344 may be retained at one or more axial positions relative to the gear set 400 by corresponding first and second mid retention mechanisms 354, 356. For example, the mid clutch rings 342, 344 may be retained in respective engaged positions relative to the first-stage carrier 416 by the corresponding retention mechanisms 354, 356. In one example, the retention mechanisms 354, 356 may be formed as spring-loaded ball and detent mechanisms. An axial force applied to the mid clutch rings 342, 344 exceeding a predetermined threshold value causes the mid retention mechanisms 354, 356 to release the corresponding mid clutch rings 342, 344 for repositioning relative to the gear set 400.

The one or more first mid clutch engagement elements 350 and the one or more second mid clutch engagement elements 352 may be provided as cavities, protrusions, teeth, or dogs, or combinations thereof, configured for circumferential engagement that are oriented towards the first-stage carrier 416. The one or more first mid gear engagement elements 550 and the one or more second mid gear engagement elements 552 are arranged on an axial face of the first-stage carrier 416 and are oriented in a direction to selectively interact with corresponding first and second mid clutch engagement elements 350, 352.

The first and second mid clutch engagement elements 350, 352 are each formed with a squared or perpendicular side 358, 360 facing generally in a clock (rotational) direction and a ramped side 362, 364 angled relative to the squared sides 358, 360. The first and second mid gear engagement elements 550, 552 are each formed with a squared or perpendicular side 558, 560 facing generally in a clock direction opposing the squared side 358, 360 of the corresponding first and second mid clutch engagement element 350, 352. The first and second mid gear engagement elements 550, 552 are each formed with a ramped side 562, 564 facing generally in a direction opposing the ramped side 362, 364 of the corresponding first and second mid clutch engagement element 350, 352.

In one example, the squared sides 358 of the first mid clutch engagement elements 350 generally face in the second clock direction D2 and the squared sides 558 of the first mid gear engagement elements 550 generally face in the first clock direction D1. The ramped sides 362 of the first mid clutch engagement elements 350 face partially in the first clock direction D1 and the ramped sides 562 of the first mid gear engagement elements 550 face partially in the second clock direction D2.

In the engaged position of the first mid clutch ring 342, the squared sides 358, 558 of corresponding first mid clutch engagement elements 350 and first mid gear engagement elements 550 are disposed in opposing relationship with each other and are configured to interact with one another, for example, in response to application of a force to the first-stage carrier 416 for effecting rotation of the first-stage carrier 416 on the drive axis 92 in the first clock direction D1. In addition, the ramped sides 362, 562 of corresponding first mid clutch engagement elements 350 and first mid gear engagement elements 550 are disposed in opposing relationship with each other and are configured to interact with one another, for example, in response to rotation of the first-stage carrier 416 relative to the first mid clutch ring 342 in the second clock direction D2.

The first mid clutch ring 342 is grounded to the second hub 108. Thus, in the engaged position of the first mid clutch ring 342, the first-stage carrier 416 is grounded, i.e., held against rotation, in the first clock direction D1 by way of the interaction between the squared sides 358, 558 of the corresponding engagement elements 350, 550. Moreover, the first-stage carrier 416 may "overrun" or "slip" (e.g., slide along the ramps) relative to the first mid clutch ring 342 in the second clock direction D2 by way of interaction between the ramped sides 362, 562 of the corresponding engagement elements 350, 550. In this example, interaction between ramped sides 362, 562 causes an axial force to be applied to the first mid clutch ring 342. If the axial force is sufficient to overcome a retaining force of the first mid retention mechanism 354, the first mid clutch ring 342 moves axially away from the first-stage carrier 416. In one example, the first mid clutch engagement elements 350 are moved out of engagement from the first mid gear engagement elements 550 such that the first mid clutch ring 342 may be considered disengaged from the gear set 400.

Further, in this example, the squared sides 360 of the second mid clutch engagement elements 352 generally face in the first clock direction D1 and the squared sides 560 of the second mid gear engagement elements 552 generally face in the second clock direction D2. The ramped sides 364 of the second mid clutch engagement elements 352 face partially in the second clock direction D2 and the ramped sides 564 of the second mid gear engagement elements 552 face partially in the first clock direction D1.

In the engaged position of the second mid clutch ring 344, the squared sides 360, 560 of corresponding second mid clutch engagement elements 352 and the second mid gear engagement elements 552 are disposed in opposing relationship and configured to interact with one another, for example, in response to application of a force to the first-stage carrier 416 for effecting rotation of the first-stage carrier 416 on the drive axis 92 in the second clock direction D2. In addition, the ramped sides 364, 564 of corresponding second mid clutch engagement elements 352 and second mid gear engagement elements 552 are disposed in opposing relationship and are configured to interact with one another, for example, in response to rotation of the first-stage carrier 416 relative to the second mid clutch ring 344 in the first clock direction D1.

The second mid clutch ring 344 is grounded to the first hub 106. Thus, in the engaged position of the second mid clutch ring 344, the first-stage carrier 416 is grounded, i.e., held against rotation, in the second clock direction D2 by way of interaction between the squared sides 360, 560 of the corresponding engagement elements 352, 552. Moreover, the first-stage carrier 416 may "overrun" or "slip" (e.g., slide along the ramps) relative to the second mid clutch ring 344 in the first clock direction D1 by way of interaction between the ramped sides 364, 564 of the corresponding engagement elements 352, 552. In this example, interaction between ramped sides 364, 564 of the corresponding engagement elements 352, 552 causes an axial force to be applied to the second mid clutch ring 344. If the axial force is sufficient to overcome a retaining force of the second mid retention mechanism 356, the second mid clutch ring 344 moves axially away from the first-stage carrier 416. In one example, the second mid clutch engagement elements 352 are moved out of engagement from the second mid gear engagement elements 552 such that the second mid clutch ring 344 may be considered disengaged from the gear set 400.

The first and second mid clutch rings 342, 344 may be repositioned by corresponding mid actuators 242, 244 individually and independently of one another. Accordingly, the first and second mid clutch rings 342, 344 may be considered to have a first collective position in which the first and second mid clutch rings 342, 344 are disengaged from the gear set 400, a second collective position in which the first mid clutch ring 342 is engaged with the gear set 400 and the second mid clutch ring 344 is disengaged from the gear set 400, a third collective position in which the first mid clutch ring 342 is disengaged from the gear set 400 and the second mid clutch ring 344 is engaged with the gear set 400, and a fourth collective position in which the first and second mid clutch rings 342, 344 are engaged with the gear set 400.

In the first collective position, the first-stage carrier 416 may rotate relative to the mid clutch rings 342, 344 in the first and second clock directions D1, D2. In the second collective position, the mid clutch arrangement 340 may be considered unidirectionally engaged to ground the first-stage carrier 416 in the first clock direction D1 and not in the second clock direction D2. In the third collective position, the mid clutch arrangement 340 may be considered unidirectionally engaged to ground the first-stage carrier 416 in the second clock direction D2 and not in the first clock direction D1. In the fourth collective position, the mid clutch arrangement 340 may be considered bi-directionally engaged to ground the first-stage carrier 416 in the first and second clock directions D1, D2.

Figure 15:
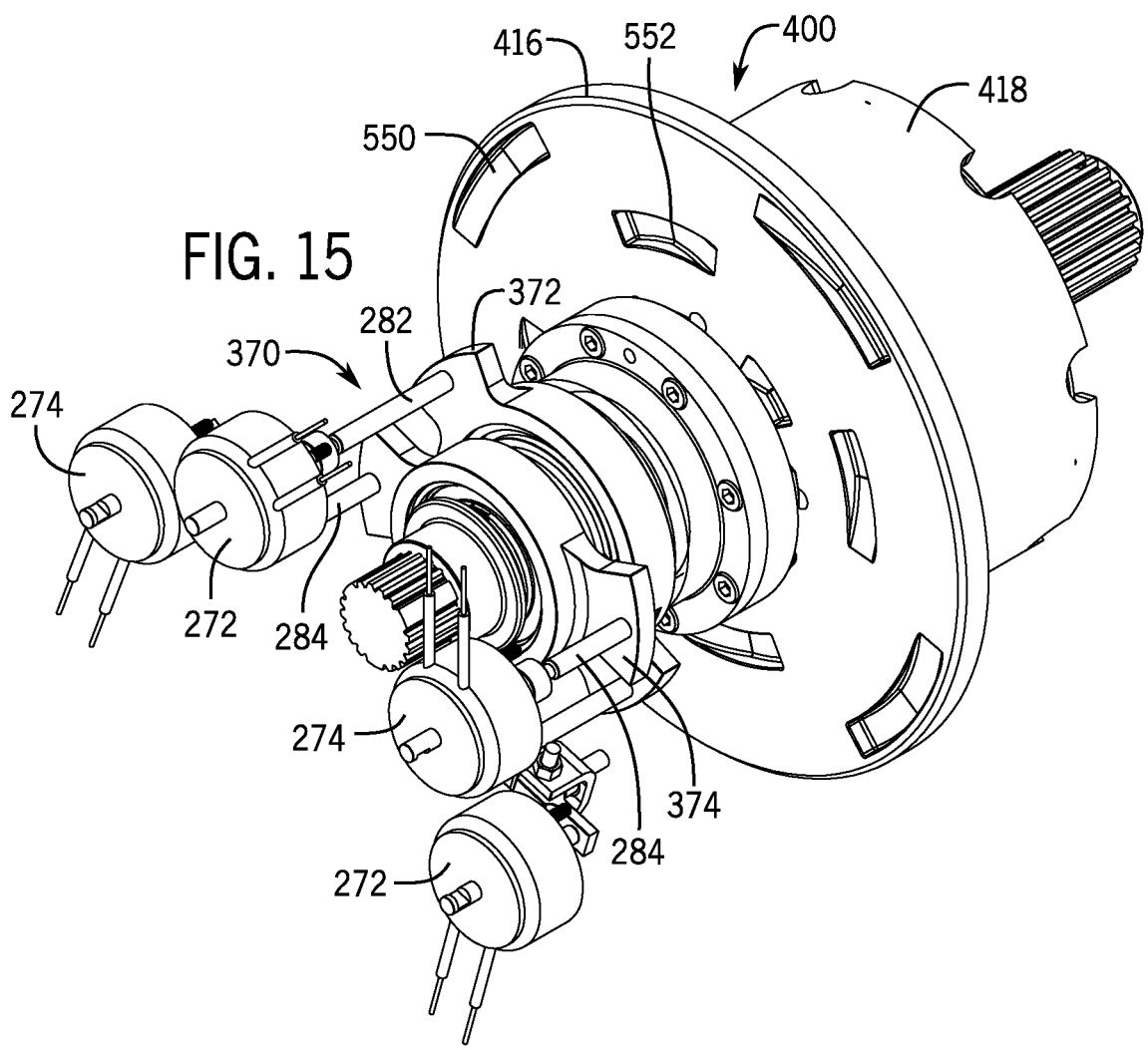
FIG. 15 is a first isometric view of a third clutch arrangement and a portion of a gear set of the drive assembly of FIGS. 3 and 4.
Figure 16:
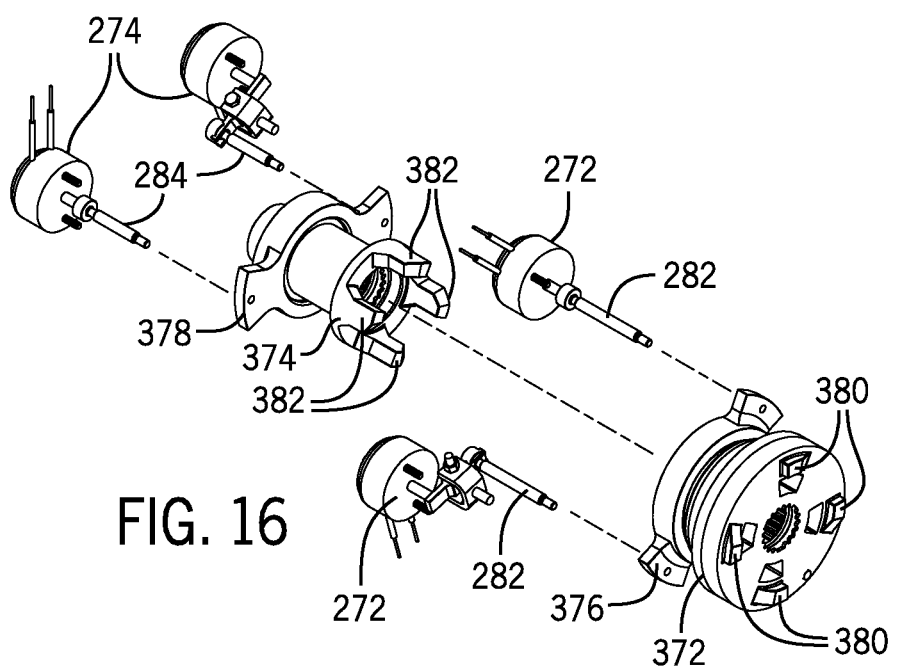
FIG. 16 is partial exploded isometric view of the third clutch arrangement of the drive assembly of FIGS. 3 and 4.
Figure 17:
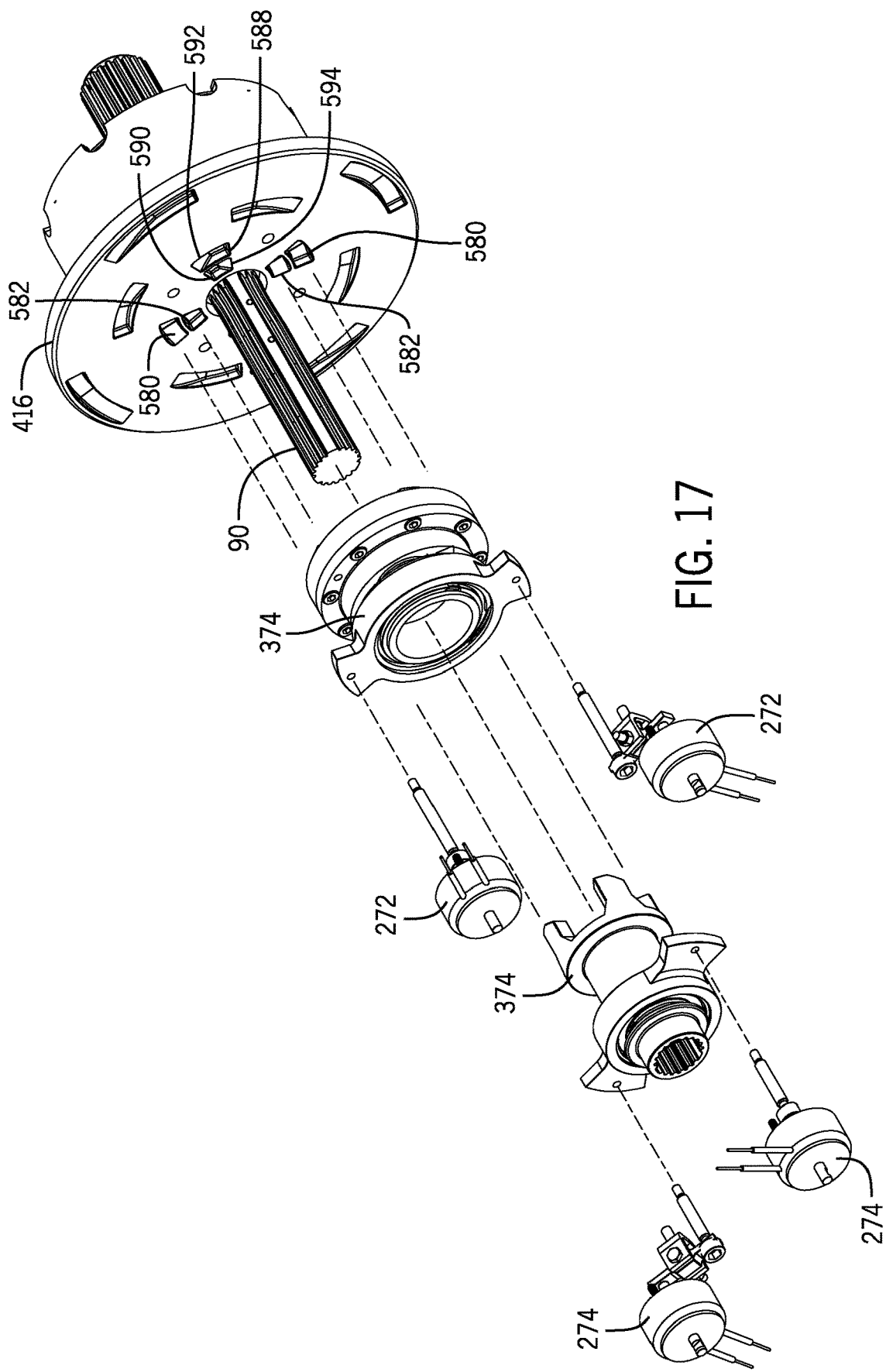
FIG. 17 is an exploded isometric view of the third clutch arrangement and a portion of the gear set of the drive assembly of FIGS. 3 and 4.
Figure 18:
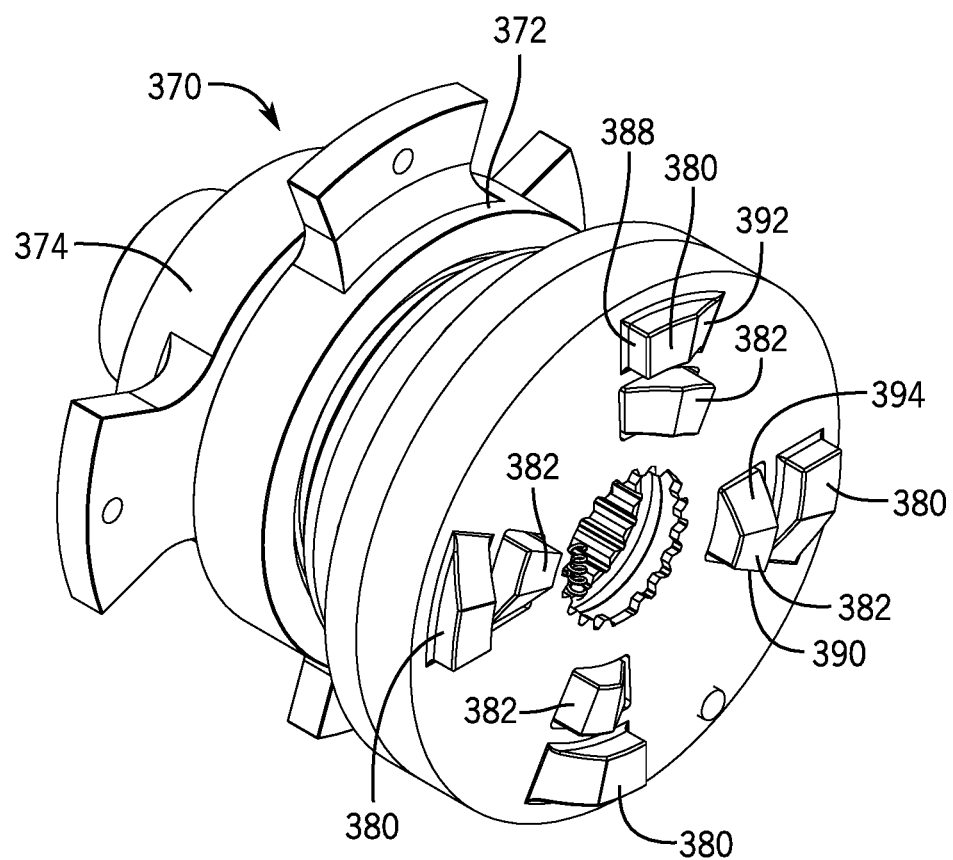
FIG. 18 is a second isometric view of the third clutch arrangement of the drive assembly of FIGS. 3 and 4.

Referring again to FIG. 8, and with additional reference now to FIGS. 15-17, the high clutch arrangement 370 is shown positioned relative to another portion of the gear set 400. In one example, the high clutch arrangement 370 includes a first high clutch ring 372 and a second high clutch ring 374. The first and second high clutch rings 372, 374 are generally ring-shaped and positioned for axial movement along the drive shaft 90 toward and away from the gear set 400. In one example, the first and second high clutch rings 372, 374 circumscribe and are rotationally fixed to the drive shaft 90, for example, by splined engagements.

The first and second high clutch rings 372, 374 are generally positioned proximate to the first-stage carrier 416. The first and second high clutch rings 372, 374 include mounting structure or tabs 376, 378 such that the first high clutch ring 372 is coupled to the first high linkage 282 and the second high clutch ring 374 is coupled to the second high linkage 284 for actuation by corresponding high actuators 272, 274. In effect, the first and second high clutch rings 372, 374 may be considered a bifurcated clutch arrangement.

The first high clutch ring 372 includes one or more first high clutch engagement elements 380 configured for selective engagement with, and disengagement from, the first-stage carrier 416. In one example, the first high clutch engagement elements 380 may selectively engage and disengage corresponding first high gear engagement elements 580 on the first-stage carrier 416.

The second high clutch ring 374 includes one or more second high clutch engagement elements 382 configured for selective engagement with, and disengagement from, the first-stage carrier 416. In one example, the second high clutch engagement elements 382 may selectively engage and disengage corresponding second high gear engagement elements 582 of the first-stage carrier 416.

Accordingly, the high clutch arrangement 370 may be selectively repositioned by the high actuators 272, 274 via the linkages 282, 284 into various positions relative to the first-stage carrier 416. In one example, the first high clutch ring 372 is configured such that the first high actuator 272 functions to reposition the first high clutch ring 372 via the first high linkage 282 towards the first-stage carrier 416 to an engaged position in which the first high clutch engagement elements 380 are engaged with the corresponding first high gear engagement elements 580. Conversely, the first high clutch ring 372 may be repositioned away from the first-stage carrier 416 to a disengaged position in which the first high clutch engagement elements 380 are disengaged from the corresponding first high gear engagement elements 580.

Similarly, the second high clutch ring 374 is configured such that the second high actuator 274 functions to reposition the second high clutch ring 374 via the second high linkage 284 towards the first-stage carrier 416 to an engaged position in which the second high clutch engagement elements 382 are engaged with the corresponding second high gear engagement elements 582. Conversely, the second high clutch ring 374 may be repositioned away from the first-stage carrier 416 to a disengaged position in which the second high clutch engagement elements 382 are disengaged from the corresponding second high gear engagement elements 582.

The first and second high clutch rings 372, 374 are moved axially when repositioning from the disengaged position to the engaged position and from the engaged position to the disengaged position. In one example, the first and second high clutch rings 372, 374 are moved in the first axial direction 94 to respective engaged positions and in the second axial direction to respective disengaged positions. The first and second high clutch rings 372, 374 may be repositioned away from the first-stage carrier 416 and moved to respective disengaged positions, for example, under a biasing force from respective biasing elements and/or by operation of corresponding high actuators 272, 274. In some examples, the first and second high actuators 272, 274 may remain activated to maintain the first and second high clutch rings 372, 374 in respective engaged positions. The high actuators 272, 274 may be deactivated to allow respective biasing elements (not shown) to reposition the high clutch rings 372, 374 away from the first-stage carrier 416.

In some examples, the first and second high clutch rings 372, 374 may be retained at one or more axial positions relative to the gear set 400 by corresponding first and second high retention mechanisms 384, 386. For example, the high clutch rings 372, 374 may be retained in respective engaged positions relative to first-stage carrier 416 by the corresponding retention mechanisms 384, 386. In one example, the retention mechanisms 384, 386 may be formed as spring-loaded ball and detent mechanisms. An axial force applied to the high clutch rings 372, 374 exceeding a predetermined threshold value causes the high retention mechanisms 384, 386 to release the corresponding high clutch rings 372, 374 for repositioning relative to the gear set 400.

The one or more first high clutch engagement elements 380 and the one or more second high clutch engagement elements 382 may be provided as cavities, protrusions, teeth, or dogs, or combinations thereof, configured for circumferential engagement that are oriented towards the first-stage carrier 416. The one or more first high gear engagement elements 580 and the one or more second high gear engagement elements 582 are arranged on an axial face of the first-stage carrier 416 and are oriented in a direction to selectively interact with corresponding first and second high clutch engagement elements 380, 382.

The first and second high clutch engagement elements 380, 382 are each formed with a squared or perpendicular side 388, 390 facing generally in a clock (rotational) direction and a ramped side 392, 394 angled relative to the square sides 388, 390. The first and second high gear engagement elements 580, 582 are each formed with a squared or perpendicular side 588, 590 facing generally in a clock direction opposing the squared side 388, 390 of the corresponding first and second high clutch ring engagement element 380, 382. The first and second high gear engagement elements 580, 582 are each formed with a ramped side 592, 594 facing generally in a direction opposing the ramped side 392, 394 of the corresponding first and second high clutch engagement element 380, 382.

In one example, the squared sides 388 of the first high clutch engagement elements 380 generally face in the second clock direction D2 and the squared sides 588 of the first high gear engagement elements 580 generally face in the first clock direction D1. The ramped sides 392 of the first high clutch engagement elements 380 face partially in the first clock direction D1 and the ramped sides 592 of the first high gear engagement elements 580 face partially in the second clock direction D2.

In the engaged position of the first high clutch ring 372, the squared sides 388, 588 of corresponding first high clutch engagement elements 380 and first high gear engagement elements 580 are disposed in opposing relationship and configured to interact with one another, for example, in response to rotation of the drive shaft 90 and the first high clutch ring 372 in the second clock direction D2. In addition, the ramped sides 392, 592 of corresponding first high clutch engagement elements 380 and first high gear engagement elements 580 are disposed in opposing relationship with other and are configured to interact with one another, for example, in response to rotation of the drive shaft 90 and the first high clutch ring 372 relative to the first-stage carrier 416 in the first clock direction D1.

The first high clutch ring 372 is rotationally fixed to the drive shaft 90, and thus, rotates with the drive shaft 90. Thus, in the engaged position of the first high clutch ring 372, rotation of the drive shaft 90 in the second clock direction D2 causes the first high clutch ring 372 to rotate in the second clock direction D2 and apply a rotational force to the first-stage carrier 416 in the second clock direction D2 by way of interaction between the squared sides 388, 588 of the corresponding engagement elements 380, 580. In this manner, the first high clutch ring 372 drives the first-stage carrier 416 to the rotate in the second clock direction D2. Moreover, the first high clutch ring 372 may "overrun" or "slip" (e.g., slide along the ramps) relative to the first-stage carrier 416 in the first clock direction D1 by way of interaction between the ramped sides 392, 592 of the corresponding engagement elements 380, 580. In this example, interaction between ramped sides 392, 592 causes an axial force to be applied to the first high clutch ring 372. If the axial force is sufficient to overcome a retaining force of the first high retention mechanism 384, the first high clutch ring 372 moves axially away from the first-stage carrier 416. In one example, the first high clutch engagement elements 380 are moved out of engagement from the first high gear engagement elements 580 such that the first high clutch ring 372 may be considered disengaged from the gear set 400.

Further, in this example, the squared sides 390 of the second high clutch engagement elements 382 generally face in the first clock direction D1 and the squared sides 590 of the second high gear engagement elements 582 generally face in the second clock direction D2. The ramped sides 394 of the second high clutch engagement elements 382 face partially in the second clock direction D2 and the ramped sides 594 of the second high gear engagement elements 582 face partially in the first clock direction D1.

In the engaged position of the second high clutch ring 374, the squared sides 390, 590 of corresponding second high clutch engagement elements 382 and the second high gear engagement elements 582 are disposed in opposing relationship and configured to interact with one another, for example, in response to rotation of the drive shaft 90 and the second high clutch ring 374 in the first clock direction D1. In addition, the ramped sides 394, 594 of corresponding second high clutch engagement elements 382 and second high gear engagement elements 582 are disposed in opposing relationship and are configured to interact with one another, for example, in response to rotation of the drive shaft 90 and the second high clutch ring 374 relative to the first-stage carrier 416 in the second clock direction D2.

The second high clutch ring 374 is rotationally fixed to the drive shaft 90, and thus, rotates with the drive shaft 90. Thus, in the engaged position of the second high clutch ring 374, rotation of the drive shaft 90 in the first clock direction D1 causes the second high clutch ring 374 to rotate in the first clock direction D1 and apply a rotational force to the first-stage carrier 416 in the first clock direction D1 by way of interaction between the squared sides 390, 590 of the corresponding engagement elements 382, 582. In this manner, the second high clutch ring 374 drives the first-stage carrier 416 to rotate in the first clock direction D1. Moreover, the second high clutch ring 374 may "overrun" or "slip" (e.g., slide along the ramps) relative to the first-stage carrier 416 in the second clock direction D2 by way of interaction between the ramped sides 394, 594 of the corresponding engagement elements 382, 582. In this example, interaction between ramped sides 394, 594 of the corresponding engagement elements 382, 582 causes an axial force to be applied to the second high clutch ring 374. If the axial force is sufficient to overcome a retaining force of the second high retention mechanism 386, the second high clutch ring 374 moves axially away from the first-stage carrier 416. In one example, the second high clutch engagement elements 382 are moved out of engagement from the second high gear engagement elements 582 such that the second high clutch ring 374 may be considered disengaged from the gear set 400.

The first and second high clutch rings 372, 374 may be repositioned by corresponding high actuators 272, 274 individually and independently of one another. Accordingly, the first and second high clutch rings 372, 374 may be considered to have a first collective position in which the first and second high clutch rings 372, 374 are disengaged from the gear set 400, a second collective position in which the first high clutch ring 372 is engaged with the gear set 400 and the second high clutch ring 374 is disengaged from the gear set 400, a third collective position in which the first high clutch ring 372 is disengaged from the gear set 400 and the second high clutch ring 374 is engaged with the gear set 400, and a fourth collective position in which the first and second high clutch rings 372, 374 are engaged with the gear set 400.

In the first collective position, the first and second high clutch rings 372, 374 may rotate relative to the first-stage carrier 416 in the first and second clock directions D1, D2. In the second collective position, the high clutch arrangement 370 may be considered unidirectionally engaged to rotate the first-stage carrier 416 in the second clock direction D2 and not in the first clock direction D1. In the third collective position, the high clutch arrangement 370 may be considered unidirectionally engaged to ground the first-stage carrier 416 in the first clock direction D1 and not in the second clock direction D2. In the fourth collective position, the high clutch arrangement 370 may be considered bi-directionally engaged to rotate the first-stage carrier 416 in the first and second clock directions D1, D2.

Interactions between the clutch arrangements 310, 340, 370 and gear set 400 modify power flow through the gear set 400 to facilitate different operating modes (or "gears") and different output directions (e.g., "forward" as clock direction D1 and "reverse" as clock direction D2) of the drive assembly 56. The operational modes include forward and reverse low modes, forward and reverse mid modes, and forward and reverse high modes.

Figure 19:
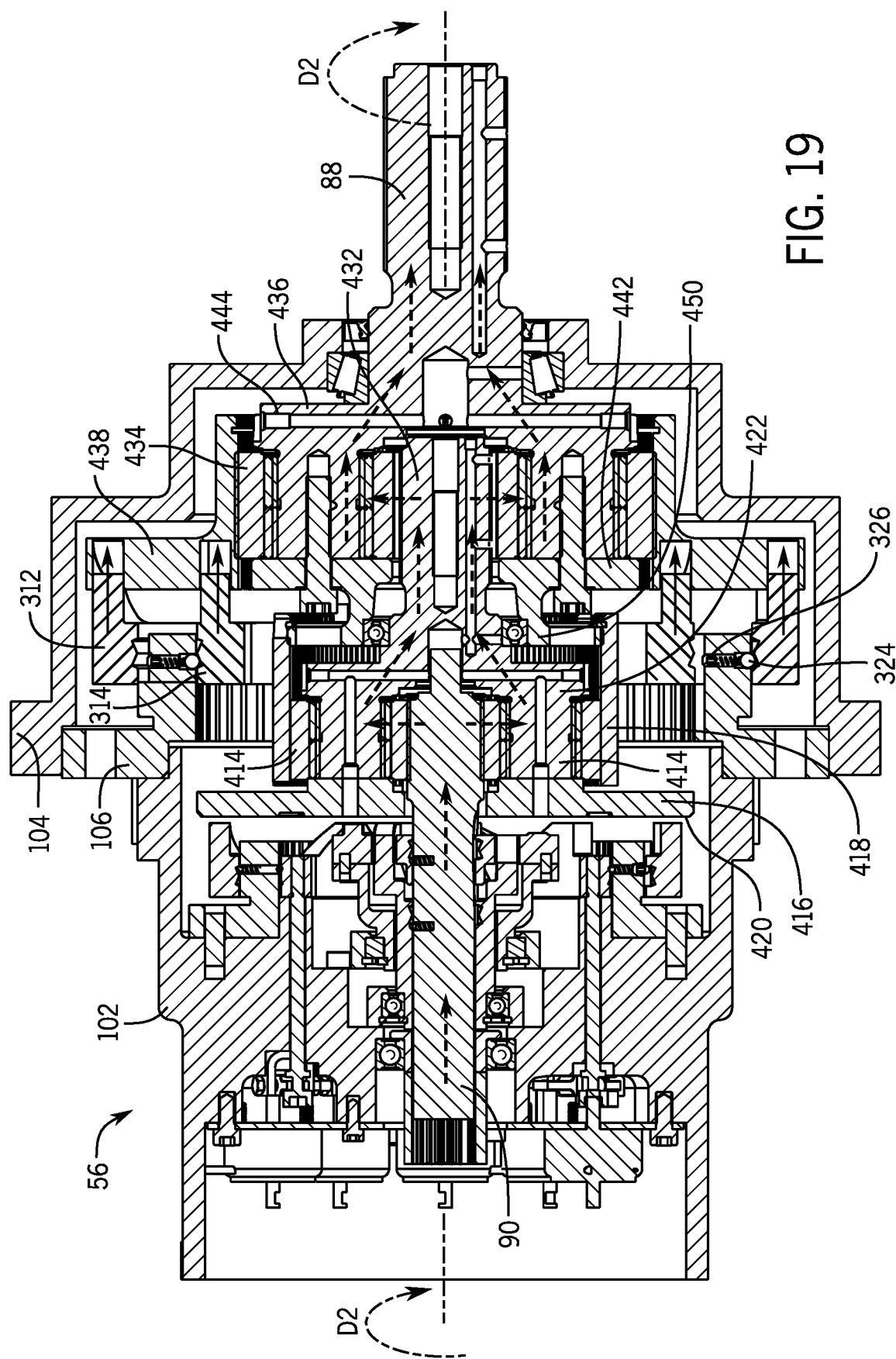
FIG. 19 is a cross-sectional view of the drive assembly of FIGS. 3 and 4 through line 19-19 of FIG. 6, showing a first clutch arrangement engaged with the gear set.

FIG. 19 is a cross-sectional view of the drive assembly 56 in which the low clutch arrangement 310 is engaged with the gear set 400 and the mid and high clutch arrangements 340, 370 are disengaged from the gear set 400 to provide the low mode in forward and reverse directions depending on a clock direction of the drive shaft 90. In the low mode, the low clutch arrangement 310 grounds the second-stage ring gear 438, and thus, holds the second-stage ring gear 438 against rotation relative to the stationary portions of the drive assembly 56. In the forward low mode, the input element 86 is driven in the second clock direction D2 to rotate the drive shaft 90 in the second clock direction D2. The first-stage sun gear 412 rotates with the drive shaft 90 in the second clock direction D2, which in turn, effects rotation of the first-stage carrier 416, via the first-stage planet gears 414, in the second clock direction D2. The first-stage carrier 416 is rotationally fixed to the second-stage sun gear 432, and thus, effects rotation of the second-stage sun gear 432 in the second clock direction D2. With the second-stage ring gear 438 grounded by the low clutch arrangement 310, the second-stage sun gear 432 effects rotation of the second-stage carrier 436 in the second clock direction D2, via the second-stage planet gears 434. The second-stage carrier 436 functions as the output element 88. Thus, in the forward low mode, the second-stage carrier 436 rotates in the second clock direction D2 to output a first speed and a first torque. In the reverse low mode, the drive shaft 90 and the second-stage carrier 436 may rotate in the first clock direction D1.

Accordingly, in the low mode, power flows along the drive shaft 90 to the first-stage sun gear 412, the first-stage planet gears 414 and the first-stage carrier 416. Power flows from the first-stage carrier 416 to the second-stage sun gear 432 and the second-stage planet gears 434 and is output by the second-stage carrier 436 which includes, or functions as, the output element 88.

In the low mode, the drive shaft 90 and the second-stage carrier 436, including the output element 88, rotate in the same direction. That is, in the low mode, the input rotation direction and the output rotation direction are the same. For example, in the forward low mode, the drive shaft 90 and the second-stage carrier 436 may both rotate in the second clock direction D2, while in the reverse low mode, the drive shaft 90 and the second-stage carrier 436 may both rotate in the first clock direction D1.

In one example, the drive assembly 56 may provide a 9:1 gear ratio in the power flow direction of the forward and reverse low modes. In other embodiments, other gear ratios may be provided.

Figure 20:
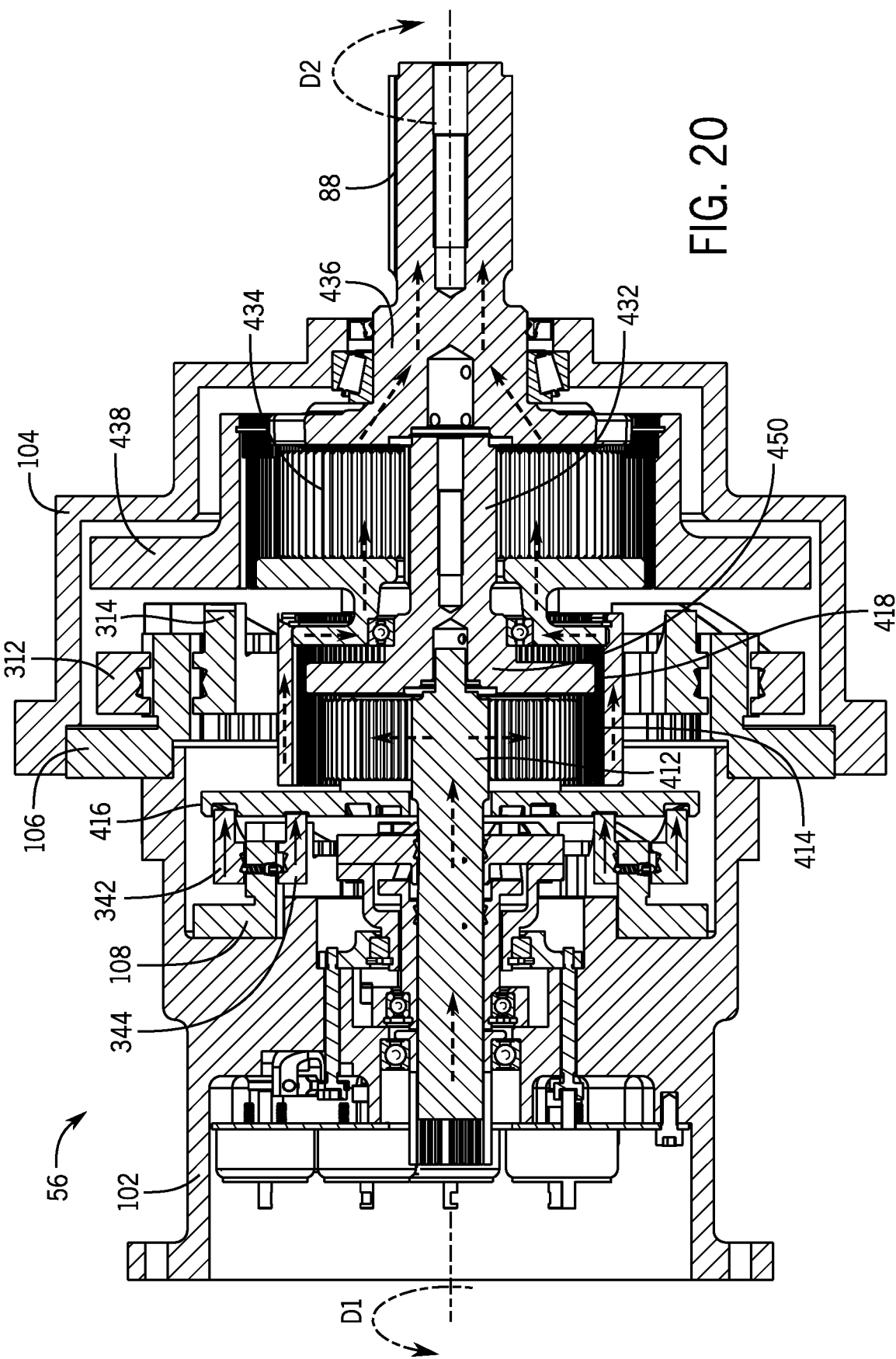
FIG. 20 is a cross-sectional view of the drive assembly of FIGS. 3 and 4 through line 20-20 of FIG. 6, showing a second clutch arrangement engaged with the gear set.

FIG. 20 is a cross-sectional view of the drive assembly 56 in which the mid clutch arrangement 340 is engaged with the gear set 400 and the low and high clutch arrangements 310, 370 are disengaged from the gear set 400 to provide the mid mode in forward and reverse directions depending on a clock direction of the drive shaft 90. In the mid mode, the mid clutch arrangement 340 grounds the first-stage carrier 416, and thus, holds the first-stage carrier 416 against rotation relative to the stationary portions of the drive assembly 56. In the forward mid mode, the input element 86 is driven in the first clock direction D1 to rotate the drive shaft 90 in the first clock. The first-stage sun gear 412 rotates with the drive shaft 90 in the first clock direction D1, which in turn, effects rotation of the first-stage planet gears 414 on the respective first planet axles 424. With the first-stage carrier 416 grounded, rotation of the first-stage planet gears 414 effects rotation of the first-stage ring gear 418 in the second clock direction D2. The first-stage ring gear 418 is rotationally fixed to the second-stage carrier 436, for example, by way of the carrier adapter 450, and thus, effects rotation of the second-stage carrier 436 in the second clock direction D2. The second-stage carrier 436 functions as, or includes, the output element 88. Thus, in the forward mid mode, the second-stage carrier 436 rotates in the second clock direction D2 to output a second speed and a second torque. The second speed is greater than first speed, and the second torque is less than the first torque. In the reverse mid mode, the drive shaft 90 may rotate in the second clock direction D2 and the second-stage carrier 436 may rotate in the first clock direction D1.

Accordingly, in the mid mode, power flows along the drive shaft 90 to the first-stage sun gear 412, the first-stage planet gears 414 and the first-stage ring gear 418. Power flows from the first-stage ring gear 418 to the carrier adapter 450 and is output by the second-stage carrier 436 which includes, or functions as, the output element 88.

In the mid mode, the drive shaft 90 and the second-stage carrier 436, including the output element 88, rotate in the opposite directions. That is, in the mid mode, the input rotation direction and the output rotation direction are different. For example, in the forward mid mode, the drive shaft 90 may rotate in the first clock direction D1 and the second-stage carrier 436 may rotate in the second clock direction D2, while in the reverse mid mode, the drive shaft 90 may rotate in the second clock direction D2 and the second-stage carrier 436 may rotate in the first clock direction D1.

In one example, the drive assembly 56 may provide a 3:1 gear ratio in the power flow direction of the forward and reverse mid modes. In other embodiments, other gear ratios may be provided. The gear set 400 is configured such that a step ratio between the mid mode and the low mode is 3:1.

Figure 21:
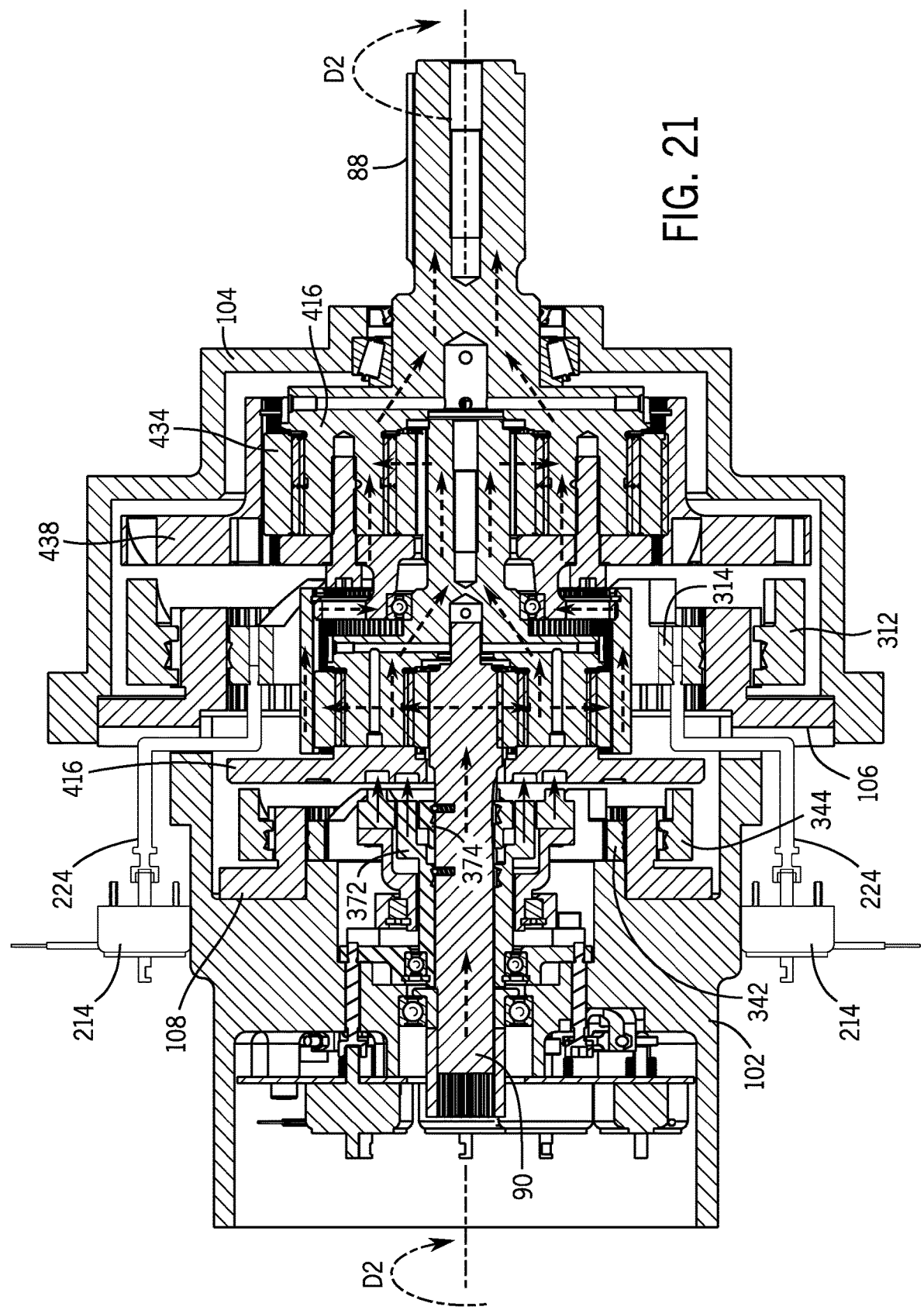
FIG. 21 is a cross-sectional view of the drive assembly of FIGS. 3 and 4 through line 21-21 of FIG. 6, showing arrows indicating movement of the third clutch arrangement to engage the gear set, according to an embodiment.

FIG. 21 is a cross-sectional view of the drive assembly 56 in which arrows indicate a direction of movement of the high clutch arrangement 370 to engage the gear set 400 and the low and mid clutch arrangements 310, 340 are disengaged from the gear set 400 to provide high mode in forward and reverse directions depending on a clock direction of the drive shaft 90. The high clutch arrangement 370 rotationally fixes the drive shaft 90 to the first-stage carrier 416, and thus, enables the drive shaft 90, the high clutch arrangement 370, the first-stage sun gear 412 and the first-stage carrier 416 to rotate as a unit. In the forward high mode, the input element 86 is driven in the second clock direction D2 to rotate the drive shaft 90, the high clutch arrangement 370, the first-stage sun gear 412 and the first-stage carrier 416 in the second clock direction D2 as a unit. The first-stage carrier 416 and the first-stage sun gear 412, rotating as a unit, effect collective rotation of the first-stage planet gears 414 about the drive axis 92 in the second clock direction D2. The first-stage planet gears 414 effect rotation of the first-stage ring gear 418 in the second clock direction D2 as well. In this manner, the drive shaft 90, the high clutch arrangement 370, the first-stage sun gear 412, the first-stage carrier 416, the first-stage planet gears 414 and the first-stage ring gear 418 rotate as a unit in the second clock direction D2. With the first-stage ring gear 418 rotationally fixed to the second-stage carrier 436 via the carrier adapter 450, the first-stage ring gear 418 effects rotation of the second-stage carrier 436 in the second clock direction D2 as a unit with the first-stage ring gear 418. The second-stage carrier 436 functions as, or includes, the output element 88. Thus, in the forward high mode, the second-stage carrier 436 rotates in the second clock direction D2 to output a third speed and a third torque. The third speed is greater than first and second speeds, and the third torque is less than the first and second torques. In the reverse high mode, the drive shaft 90 and the second-stage carrier 436 may rotate in the first clock direction D1.

Accordingly, in the high mode, power flows along the drive shaft 90 and the high clutch arrangement 370 to the first-stage sun gear 412 and the first-stage carrier 416. Power flows from the first-stage sun gear 412 and the first-stage carrier 416 to the first-stage planet gears 414 and in turn, to the first-stage ring gear 418. Power flows from the first-stage ring gear 418 to the second-stage carrier 436 via the carrier adapter 450, and is output by the second-stage carrier 436 which includes, or functions as, the output element 88.

It will be appreciated that with the first-stage carrier 416 rotationally fixed to the second-stage sun gear 432, via the second-stage shaft 440, the first-stage carrier 416 and the second-stage sun gear 432 rotate together as a unit in the same direction as the input element 86 and the drive shaft 90. The second-stage sun gear 432 and the second-stage carrier 436 effect collective rotation of the second-stage planet gears 434, and in turn, the second-stage ring gear 438 about the drive axis 92 together as a unit with the second-stage carrier 436 and the second-stage sun gear 432. Thus, in the high mode, the drive shaft 90 drives the gear set 400 to rotate as a unit.

It will further be appreciated that power may flow from the first-stage carrier 416 to the second-stage sun gear 432, and in turn, to the second-stage planet gears 434. Power may also flow from the second-stage carrier 436 to the second-stage planet gears 434, for example, via the second planet axles 446. Power may flow from the second-stage planet gears 434 to the second-stage ring gear 438 as well.

In the high mode, the drive shaft 90 and the second-stage carrier 436, including the output element 88, rotate in the same direction. That is, in the high mode, the input rotation direction and the output rotation direction are the same. For example, in the forward high mode, the drive shaft 90 and the second-stage carrier 436 may both rotate in the second clock direction D2. In the reverse high mode, the drive shaft 90 and the second-stage carrier 436 may both rotate in the first clock direction D1.

In one example, the drive assembly 56 may provide a 1:1 gear ratio, i.e., a direct gear ratio, in the power flow direction of the forward and reverse high modes. In other embodiments, other gear ratios may be provided. The gear set 400 is configured such that a step ratio between the high mode and the mid mode is 3:1.

In this manner, the high clutch arrangement 370 may selectively operate in the forward high mode and reverse high mode with bi-directionality based on the direction of the input element 86. As noted above, in other examples, the high clutch arrangement may be configured to selectively operate unidirectionally (e.g., with multiple gear rings).

Although the drive assembly 56 is described above with respect to a three-speed drive assembly, one or more of the clutch arrangements 310, 340, 370 (and associated actuators 210, 240, 270) may be omitted to result in a two-speed drive assembly. Moreover, although the first and second clutch arrangements 310, 340 are described above as bifurcated clutch arrangements, one or more the clutch rings 312, 314, 342, 344 of each clutch arrangement 310, 340 may be omitted to, in effect, operate as overrunning clutches in the driven directions. Any suitable modification or configuration according to the principles discussed above may be provided.

ENUMERATED EXAMPLES OF WORK VEHICLE MULTI-SPEED DRIVE ASSEMBLY PROVIDING MULTIPLE GEAR RATIOS AT SAME STEP RATIO

The following examples are provided, which are numbered for easier reference.

1. A drive assembly for a work vehicle includes a housing arrangement having at least one housing element forming a reaction member, a drive shaft rotatable on a drive axis relative to the reaction member in a first clock direction and alternatively a second clock direction, and a planetary gear set coupled to the drive shaft and configured to selectively rotate an output element in the first clock direction and alternatively in the second clock direction. The planetary gear set is a two-stage planetary gear set having a first-stage sun gear, a first-stage carrier, a set of first-stage planet gears supported on the first-stage carrier, a first-stage ring gear, a second-stage sun-gear rotationally fixed to the first-stage carrier, a second-stage carrier rotationally fixed to the first-stage ring gear, a set of second-stage planet gears supported on the second-stage carrier, and a second-stage ring gear, wherein the output element rotates with the second-stage carrier. The drive assembly also includes a first clutch arrangement configured to selectively engage the planetary gear set to effect a first gear ratio and first output rotation speed and torque of the output element, a second clutch arrangement configured to selectively engage the planetary gear set to effect a second gear ratio and second output rotation speed and torque of the output element, wherein a step ratio from the first gear ratio and the second gear ratio is 3:1, at least one first actuator configured to effect movement of the first clutch arrangement along the drive axis to selectively engage the planetary gear set, and at least one second actuator configured to effect movement of the second clutch arrangement along the drive axis to selectively engage the planetary gear set. The drive shaft and the output element rotate in a same clock direction with the first clutch arrangement engaged with the planetary gear set, and the drive shaft and the output element rotate in opposite clock directions with the second clutch arrangement engaged with the planetary gear set.

2. The drive assembly of example 1, wherein the second-stage carrier includes a first second-stage carrier plate rotationally fixed to the first-stage ring gear and supporting the second-stage planet gears, and a second second-stage carrier plate spaced from and rotationally fixed to the first second-stage carrier plate. The output element is integrally formed with or connected to the second second-stage carrier plate.

3. The drive assembly of example 1, further including a first hub connected to the reaction member and grounded by the reaction member. The first clutch arrangement is a low clutch arrangement and includes a first low clutch ring mounted on and held against rotation relative to the first hub and a second low clutch ring mounted on and held against rotation relative to the first hub.

4. The drive assembly of example 3, wherein the first low clutch ring is configured to selectively engage the second-stage ring gear to hold the second-stage ring gear against rotation in one of the first clock direction and the second clock direction and overrun the second-stage ring gear with rotation of the second-stage ring gear in the other of the first clock direction and the second clock direction. The second low clutch ring is configured to selectively engage the second-stage ring gear to hold the second-stage ring gear against rotation in the other of the first clock direction and the second clock direction and overrun the second-stage ring gear with rotation of the second-stage ring gear in the one of the first clock direction and the second clock direction.

5. The drive assembly of example 3, wherein the at least one first actuator includes at least one first low actuator configured to effect movement of the first low clutch ring along the drive axis relative to the second-stage ring gear. The at least one first actuator further includes at least one second low actuator configured to effect movement of the second low clutch ring along the drive axis relative to the second-stage ring gear.

6. The drive assembly of example 1, further including a second hub connected to the reaction member and grounded by the reaction member. The second clutch arrangement is a mid clutch arrangement and includes a first mid clutch ring mounted on and held against rotation relative to the second hub and a second mid clutch ring mounted on and held against rotation relative to the second hub.

7. The drive assembly of example 6, wherein the first mid clutch ring is configured to selectively engage the first-stage carrier to hold the first-stage carrier against rotation in one of the first clock direction and the second clock direction and overrun the first-stage carrier with rotation of the first-stage carrier in the other of the first clock direction and the second clock direction. The second mid clutch ring is configured to selectively engage the first-stage carrier to hold the first-stage carrier against rotation in the other of the first clock direction and the second clock direction and overrun the first-stage carrier with rotation of the first-stage carrier in the one of the first clock direction and the second clock direction.

8. The drive assembly of example 7, wherein the at least one second actuator includes at least one first mid actuator configured to effect movement of the first mid clutch ring along the drive axis relative to the first-stage carrier. The at least one second actuator further includes at least one second mid actuator configured to effect movement of the second mid clutch ring along the drive axis relative to the first-stage carrier.

9. The drive assembly of example 1, further including a third clutch arrangement configured to selectively engage the planetary gear set to effect a third gear ratio and a third output rotation speed and torque of the output element. A step ratio from the second gear ratio to the third gear ratio is 3:1. At least one third actuator is configured to effect movement of the third clutch arrangement along the drive axis to selectively engage the planetary gear set. The drive shaft and the output element rotate in the same clock direction with the third clutch arrangement engaged with the planetary gear set.

10. The drive assembly of example 9, wherein the third clutch arrangement is a high clutch arrangement and includes a first high clutch ring mounted on and rotationally fixed to the drive shaft and a second high clutch ring mounted on and rotationally fixed to the drive shaft.

11. The drive assembly of example 10, wherein the first high clutch ring is configured to engage the first-stage carrier to drive rotation of the first-stage carrier in one of the first clock direction and the second clock direction with rotation of the drive shaft, and overrun the first-stage carrier with rotation of the drive shaft in the other of the first clock direction and the second clock direction. The second high clutch ring is configured to engage the first-stage carrier to drive rotation of the first-stage carrier in the other of the first clock direction and the second clock direction and overrun the first-stage carrier with rotation of drive shaft in the one of the first clock direction and the second clock direction.

12. The drive assembly of example 11, wherein the at least one third actuator includes at least one first high actuator configured to effect movement of the first high clutch ring along the drive axis relative to the first-stage carrier. The at least one third actuator further includes at least one second high actuator configured to effect movement of the second high clutch ring along the drive axis relative to the first-stage carrier.

13. A drive assembly for a work vehicle includes a housing arrangement having a first housing element, a second housing element, a first hub and a second hub forming a stationary reaction member, a drive shaft rotatable about a drive axis relative to the stationary reaction member in a first clock direction and alternatively in a second clock direction and a planetary gear set coupled to the drive shaft. The planetary gear set includes a first-stage sun gear, a first-stage carrier, a set of first-stage planet gears supported on the first-stage carrier, a first-stage ring gear, a second-stage sun-gear rotationally fixed to the first-stage carrier, a second-stage carrier rotationally fixed to the first-stage ring gear, a set of second-stage planet gears supported on the second-stage carrier, and a second-stage ring gear. The drive assembly also includes an output element rotatable with the second stage carrier in the first clock direction and alternatively in the second clock direction to output rotational speed and torque, a low clutch arrangement coupled to the first hub and configured to selectively engage the second-stage ring gear to effect a low mode in which the planetary gear set provides a low gear ratio, the drive shaft rotates in the second clock direction, and the output element rotates in the second clock direction, a mid clutch arrangement coupled to the second hub and configured to selectively engage the first-stage carrier to effect a mid mode in which the planetary gear set provides a mid gear ratio at a step ratio of 3:1 to the low gear ratio, the drive shaft rotates in the first clock direction and the output element rotates in the second clock direction, and a high clutch arrangement coupled to the drive shaft and configured to selectively engage the first-stage carrier to effect a high mode in which the planetary gear set provides a high gear ratio at a step ratio of 3:1 to the mid gear ratio, the drive shaft rotates in the second clock direction and the output element rotates in the second clock direction.

14. The drive assembly of example 13, further including at least one low actuator configured to reposition the low clutch arrangement along the drive axis to engage the second-stage ring gear, the at least one low actuator mounted on the first hub, at least one mid actuator configured to reposition the mid clutch arrangement along the drive axis to engage the first-stage carrier, the at least one mid actuator mounted on an actuator frame secured to the first housing element, and at least one high actuator configured to reposition the high clutch arrangement along the drive axis to engage the first-stage carrier, the at least one high actuator mounted on the actuator frame secured to the first housing element.

15. The drive assembly of example 14, further including at least one low linkage interconnected between the at least one low actuator and the low clutch arrangement, at least one mid linkage interconnected between the at least one mid actuator and the mid clutch arrangement, and at least one high linkage interconnected between the at least one high actuator and the high clutch arrangement.

CONCLUSION

As will be appreciated by one skilled in the art, certain aspects of the disclosed subject matter can be embodied as a method, system (e.g., a work vehicle control system included in a work vehicle), or computer program product. Accordingly, certain embodiments can be implemented entirely as hardware, entirely as software (including firmware, resident software, micro-code, etc.) or as a combination of software and hardware (and other) aspects. Furthermore, certain embodiments can take the form of a computer program product on a computer-usable storage medium having computer-usable program code embodied in the medium.

Any suitable computer usable or computer readable medium can be utilized. The computer usable medium can be a computer readable signal medium or a computer readable storage medium. A computer-usable, or computer-readable, storage medium (including a storage device associated with a computing device or client electronic device) can be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium can be any tangible medium that can contain, or store a program for use by or in connection with the instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be non-transitory and can be any computer readable medium that is not a computer readable storage medium and that can communicate, propagate, or transport a program for use by or in connection with an instruction execution system, apparatus, or device.

Aspects of certain embodiments are described herein can be described with reference to flowchart illustrations and/or block diagrams of methods, apparatus (systems) and computer program products according to embodiments of the disclosure. It will be understood that each block of any such flowchart illustrations and/or block diagrams, and combinations of blocks in such flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, can illustrate the architecture, functionality, and operation of possible implementations of systems, methods and computer program products according to various embodiments of the present disclosure. In this regard, each block in the flowchart or block diagrams can represent a module, segment, or portion of code, which includes one or more executable instructions for implementing the specified logical function(s). It should also be noted that, in some alternative implementations, the functions noted in the block (or otherwise described herein) can occur out of the order noted in the figures. For example, two blocks shown in succession (or two operations described in succession) can, in fact, be executed substantially concurrently, or the blocks (or operations) can sometimes be executed in the reverse order, depending upon the functionality involved. It will also be noted that each block of any block diagram and/or flowchart illustration, and combinations of blocks in any block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A drive assembly for a work vehicle comprising:
   a housing arrangement comprising at least one housing element forming a reaction member;
   a drive shaft rotatable on a drive axis relative to the reaction member in a first clock direction and alternatively a second clock direction;
   a planetary gear set coupled to the drive shaft and configured to selectively rotate an output element in the first clock direction and alternatively in the second clock direction, wherein the planetary gear set is a two-stage planetary gear set comprising a first-stage sun gear, a first-stage carrier, a set of first-stage planet gears supported on the first-stage carrier, a first-stage ring gear, a second-stage sun-gear rotationally fixed to the first-stage carrier, a second-stage carrier rotationally fixed to the first-stage ring gear, a set of second-stage planet gears supported on the second-stage carrier, and a second-stage ring gear, wherein the output element rotates with the second-stage carrier;
   a first clutch arrangement configured to selectively engage the planetary gear set to effect a first gear ratio and first output rotation speed and torque of the output element;
   a second clutch arrangement configured to selectively engage the planetary gear set to effect a second gear ratio and second output rotation speed and torque of the output element, wherein a step ratio from the first gear ratio and the second gear ratio is 3:1;
   at least one first actuator configured to effect movement of the first clutch arrangement along the drive axis to selectively engage the planetary gear set; and
   at least one second actuator configured to effect movement of the second clutch arrangement along the drive axis to selectively engage the planetary gear set,
   wherein the drive shaft and output element rotate in a same clock direction with the first clutch arrangement engaged with the planetary gear set, and the drive shaft and the output element rotate in opposite clock directions with the second clutch arrangement engaged with the planetary gear set.

2. The drive assembly of claim 1, wherein the second-stage carrier includes a first second-stage carrier plate rotationally fixed to the first-stage ring gear and supporting the second-stage planet gears, and a second second-stage carrier plate spaced from and rotationally fixed to the first second-stage carrier plate, wherein the output element is integrally formed with or connected to the second second-stage carrier plate.

3. The drive assembly of claim 1, wherein the first clutch arrangement is configured to selectively engage the second-stage ring gear.

4. The drive assembly of claim 3, further comprising a first hub connected to the reaction member and grounded by the reaction member, wherein the first clutch arrangement is a low clutch arrangement and includes a first low clutch ring mounted on and held against rotation relative to the first hub and a second low clutch ring mounted on and held against rotation relative to the first hub.

5. The drive assembly of claim 4, wherein the first low clutch ring is configured to selectively engage the second-stage ring gear to hold the second-stage ring gear against rotation in one of the first clock direction and the second clock direction and overrun the second-stage ring gear with rotation of the second-stage ring gear in the other of the first clock direction and the second clock direction, and the second low clutch ring is configured to selectively engage the second-stage ring gear to hold the second-stage ring gear against rotation in the other of the first clock direction and the second clock direction and overrun the second-stage ring gear with rotation of the second-stage ring gear in the one of the first clock direction and the second clock direction.

6. The drive assembly of claim 4, wherein the at least one first actuator includes at least one first low actuator configured to effect movement of the first low clutch ring along the drive axis relative to the second-stage ring gear, and the at least one first actuator further includes at least one second low actuator configured to effect movement of the second low clutch ring along the drive axis relative to the second-stage ring gear.

7. The drive assembly of claim 1, wherein the second clutch arrangement is configured to selectively engage the first-stage carrier.

8. The drive assembly of claim 7, further comprising a second hub connected to the reaction member and grounded by the reaction member, wherein the second clutch arrangement is a mid clutch arrangement and includes a first mid clutch ring mounted on and held against rotation relative to the second hub and a second mid clutch ring mounted on and held against rotation relative to the second hub.

9. The drive assembly of claim 8, wherein the first mid clutch ring is configured to selectively engage the first-stage carrier to hold the first-stage carrier against rotation in one of the first clock direction and the second clock direction and overrun the first-stage carrier with rotation of the first-stage carrier in the other of the first clock direction and the second clock direction, and the second mid clutch ring is configured to selectively engage the first-stage carrier to hold the first-stage carrier against rotation in the other of the first clock direction and the second clock direction and overrun the first-stage carrier with rotation of the first-stage carrier in the one of the first clock direction and the second clock direction.

10. The drive assembly of claim 9, wherein the at least one second actuator includes at least one first mid actuator configured to effect movement of the first mid clutch ring along the drive axis relative to the first-stage carrier, and the at least one second actuator further includes at least one second mid actuator configured to effect movement of the second mid clutch ring along the drive axis relative to the first-stage carrier.

11. The drive assembly of claim 1, further comprising:
a third clutch arrangement configured to selectively engage the planetary gear set to effect a third gear ratio and a third output rotation speed and torque of the output element, wherein a step ratio from the second gear ratio to the third gear ratio is 3:1, and
at least one third actuator configured to effect movement of the third clutch arrangement along the drive axis to selectively engage the planetary gear set,
wherein the drive shaft and the output element rotate in the same clock direction with the third clutch arrangement engaged with the planetary gear set.

12. The drive assembly of claim 11, wherein the third clutch arrangement is configured to selectively engage the first-stage carrier.

13. The drive assembly of claim 12, wherein the third clutch arrangement is a high clutch arrangement and includes a first high clutch ring mounted on and rotationally fixed to the drive shaft and a second high clutch ring mounted on and rotationally fixed to the drive shaft.

14. The drive assembly of claim 13, wherein the first high clutch ring is configured to engage the first-stage carrier to drive rotation of the first-stage carrier in one of the first clock direction and the second clock direction with rotation of the drive shaft, and overrun the first-stage carrier with rotation of the drive shaft in the other of the first clock direction and the second clock direction, and the second high clutch ring is configured to engage the first-stage carrier to drive rotation of the first-stage carrier in the other of the first clock direction and the second clock direction and overrun the first-stage carrier with rotation of drive shaft in the one of the first clock direction and the second clock direction.

15. The drive assembly of claim 14, wherein the at least one third actuator includes at least one first high actuator configured to effect movement of the first high clutch ring along the drive axis relative to the first-stage carrier, and the at least one third actuator further includes at least one second high actuator configured to effect movement of the second high clutch ring along the drive axis relative to the first-stage carrier.

16. The drive assembly of claim 1, wherein the set of first-stage planet gears comprises an odd number of radial rows of planet gears, and the set of second-stage planet gears comprises an odd number of radial rows of planet gears.

17. A drive assembly for a work vehicle comprising:
a housing arrangement including a first housing element, a second housing element, a first hub and a second hub forming a stationary reaction member;
a drive shaft rotatable about a drive axis relative to the stationary reaction member in a first clock direction and alternatively in a second clock direction;
a planetary gear set coupled to the drive shaft, the planetary gear set having a first-stage sun gear, a first-stage carrier, a set of first-stage planet gears supported on the first-stage carrier, a first-stage ring gear, a second-stage sun-gear rotationally fixed to the first-stage carrier, a second-stage carrier rotationally fixed to the first-stage ring gear, a set of second-stage planet gears supported on the second-stage carrier, and a second-stage ring gear;
an output element rotatable with the second-stage carrier in the first clock direction and alternatively in the second clock direction to output rotational speed and torque;
a low clutch arrangement coupled to the first hub and configured to selectively engage the second-stage ring gear to effect a low mode in which the planetary gear set provides a low gear ratio, the drive shaft rotates in the second clock direction, and the output element rotates in the second clock direction;
a mid clutch arrangement coupled to the second hub and configured to selectively engage the first-stage carrier to effect a mid mode in which the planetary gear set provides a mid gear ratio at a step ratio of 3:1 to the low gear ratio, the drive shaft rotates in the first clock direction and the output element rotates in the second clock direction; and
a high clutch arrangement coupled to the drive shaft and configured to selectively engage the first-stage carrier to effect a high mode in which the planetary gear set provides a high gear ratio at a step ratio of 3:1 to the mid gear ratio, the drive shaft rotates in the second clock direction and the output element rotates in the second clock direction.

18. The drive assembly of claim 17, further comprising:
at least one low actuator configured to reposition the low clutch arrangement along the drive axis to engage the second-stage ring gear, the at least one low actuator mounted on the first hub;
at least one mid actuator configured to reposition the mid clutch arrangement along the drive axis to engage the first-stage carrier, the at least one mid actuator mounted on an actuator frame secured to the first housing element; and
at least one high actuator configured to reposition the high clutch arrangement along the drive axis to engage the first-stage carrier, the at least one high actuator mounted on the actuator frame secured to the first housing element.

19. The drive assembly of claim 18, further comprising:
at least one low linkage interconnected between the at least one low actuator and the low clutch arrangement;
at least one mid linkage interconnected between the at least one mid actuator and the mid clutch arrangement; and
at least one high linkage interconnected between the at least one high actuator and the high clutch arrangement.

20. The drive assembly of claim 19, further comprising:
a low retention mechanism configured to retain the low clutch arrangement at at least one axial position relative to the second-stage ring gear, wherein the low retention mechanism is a spring-loaded ball detent supported on the first hub;
a mid retention mechanism configured to retain the mid clutch arrangement at at least one axial position relative to the first-stage carrier, wherein the mid retention mechanism is a spring-loaded ball detent supported on the second hub; and
a high retention mechanism configured to retain the high clutch arrangement at at least one axial position relative to the first-stage carrier, wherein the high retention mechanism is a spring-loaded ball detent supported on the drive shaft.

* * * * *